United States Patent [19]

Mikan

[11] Patent Number: 5,376,946
[45] Date of Patent: Dec. 27, 1994

[54] COMPUTER MOUSE SIMULATOR DEVICE

[76] Inventor: Peter J. Mikan, 31 Greenfield Rd., Milford, Conn. 06460

[21] Appl. No.: 121,066

[22] Filed: Sep. 13, 1993

Related U.S. Application Data

[63] Continuation-in-part of Ser. No. 726,389, Jul. 8, 1991, abandoned, and a continuation-in-part of Ser. No. 959,754, Oct. 13, 1992.

[51] Int. Cl.$^5$ .............................................. G09G 3/02
[52] U.S. Cl. .................................... 345/157; 345/173; 345/159
[58] Field of Search ............... 345/178, 173, 174, 157, 345/159, 156, 160; 178/18, 19

[56] References Cited

U.S. PATENT DOCUMENTS

| | | | |
|---|---|---|---|
| 4,710,758 | 12/1987 | Mussler et al. | 345/178 |
| 4,763,356 | 8/1988 | Day, Jr. et al. | 178/18 |
| 4,819,194 | 4/1989 | Koizumi et al. | 178/18 |
| 4,821,029 | 4/1989 | Logan et al. | 178/18 |
| 4,823,170 | 4/1989 | Hansen | 356/375 |
| 4,903,012 | 2/1990 | Ohuchi | 345/173 |
| 4,904,857 | 2/1990 | Ando et al. | 340/712 |
| 4,983,786 | 1/1991 | Stevens et al. | 178/18 |
| 5,053,758 | 10/1991 | Cornett et al. | 345/174 |
| 5,258,748 | 11/1993 | Jones | 345/172 |
| 5,283,559 | 2/1994 | Kalendra et al. | 345/168 |

FOREIGN PATENT DOCUMENTS 2139762  11/1984  United Kingdom .

OTHER PUBLICATIONS

Myers, Brad, "Creating Interaction Techniques by Demonstration", IEEE CC&A, Sep. 1987, pp. 51–60.
"Carroll Touch Announces New Add–Touch (R) Products for the Zenith ZCM–1492 Monitor and El Displays," News Release; Dateline: Round Rock, Tex. Aug. 13, 1990.
"IBM to Unwrap New Systems", Computer Reseller News Jun. 10, 1991.
Publication–"The right touch for control", Wayne Wehrer, Reprint from I & CS-Feb. 1989, 4 pages.
Publication–Euchner Finger Mouse descriptive brochure, Euchner+Co. Oct. 1989, 4 pages.
Publication–Euchner-Fingermaus descriptive brochure, Euchner+Co. Mar. 1989, 2 pages.
Publication–Ad Showcase Macweek Oct. 30, 1990, "UnMouse: More speed. Less space." Mirco Touch Systems, Inc., 1 page.
Publication–"Workstation features graphic user interface and mouse emulator" I&CS Apr., 1991, 2 pages.
Publication–"Product Spotlight", Monitormouse, Infoworld, Jul. 23, 1990, p. 13, 1 page.
Publication–OS/2 and Windows Magazine, Nov. 1990, vol. 1, No. 3, "Monitor Mouse," 4 pages.
Publication–Application Development Tools, Elographics, 1989, 4 pages.
Publication–Elographics, "All the building blocks . . . touchscreen applications," Elographics, 1989, 8 pages.
Publication–Elographics, "Pre–Comdex Release," Oct. 1990; 5 pages.
Publication–AccuTouch Touchscreen, Elographics, 1991, 2 pages.
Publication–IntelliTouch Touchscreen, Elographics, 1991, 2 pages.

*Primary Examiner*—Tommy P. Chin
*Assistant Examiner*—A. Au
*Attorney, Agent, or Firm*—H. Gibner Lehmann; K. Gibner Lehmann

[57] ABSTRACT

An electronic mouse simulator for a computer having a dedicated mouse port connector receptacle, the simulator having a multi-conductor cable and connector adapted to plug directly into the dedicated mouse port connector receptacle. The simulator includes a touchscreen device and a converter having an EPROM and program firmware therefor. The converter accepts signals from the touchscreen device and transforms them into a mouse-compatible format or mouse-compatible protocol that can be used to directly communicate through the dedicated mouse port of the computer. No modification of the computer is required; nor is special software needed, since the signals transferred at the mouse port duplicate those which would normally be transferred with a conventional mouse. In one embodiment, there is enabled an absolute mode of cursor control via the touchscreen device, with the sole electrical connection between the computer and the interface being via the computer's dedicated mouse port connector receptacle.

28 Claims, 5 Drawing Sheets

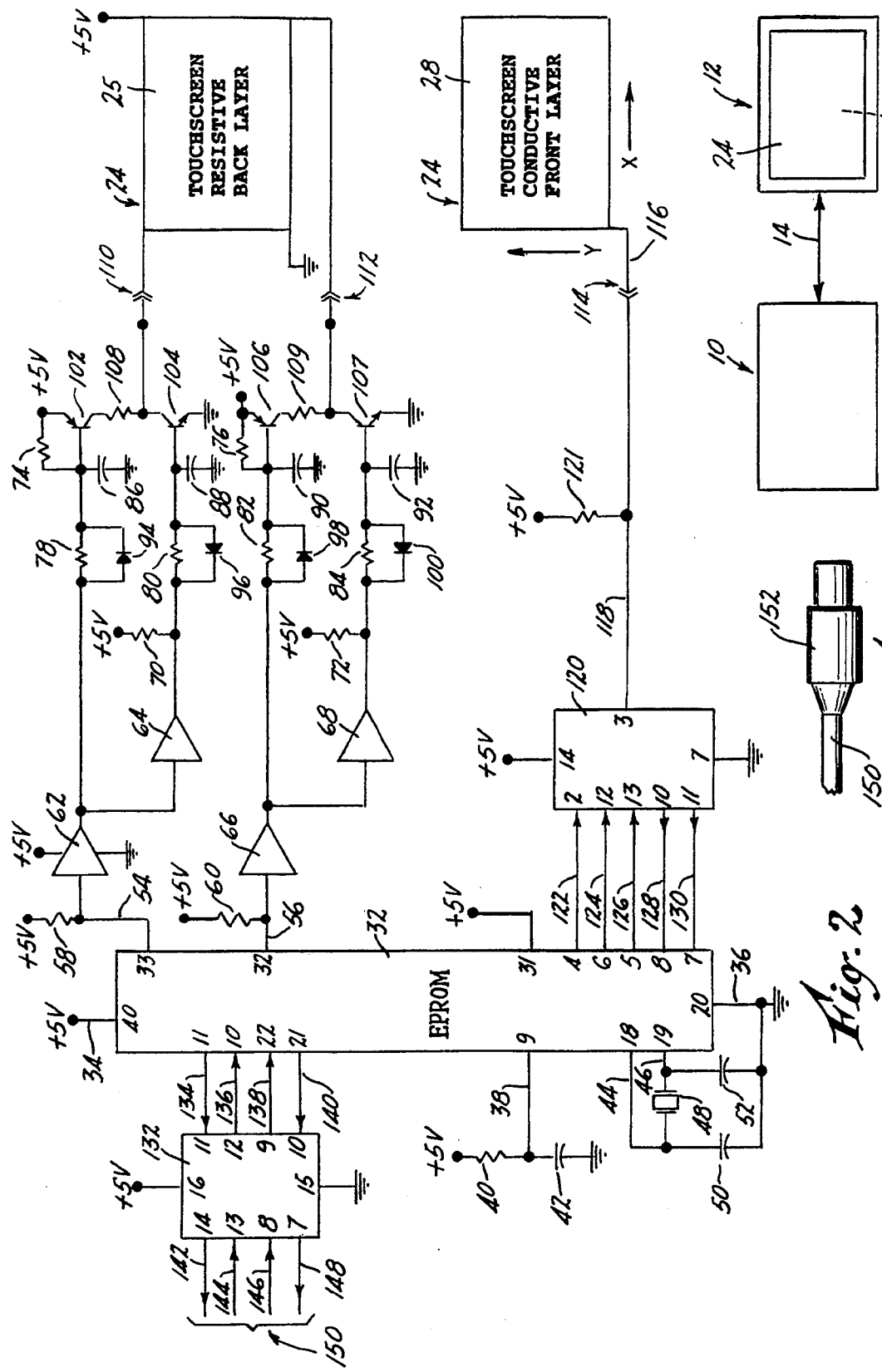

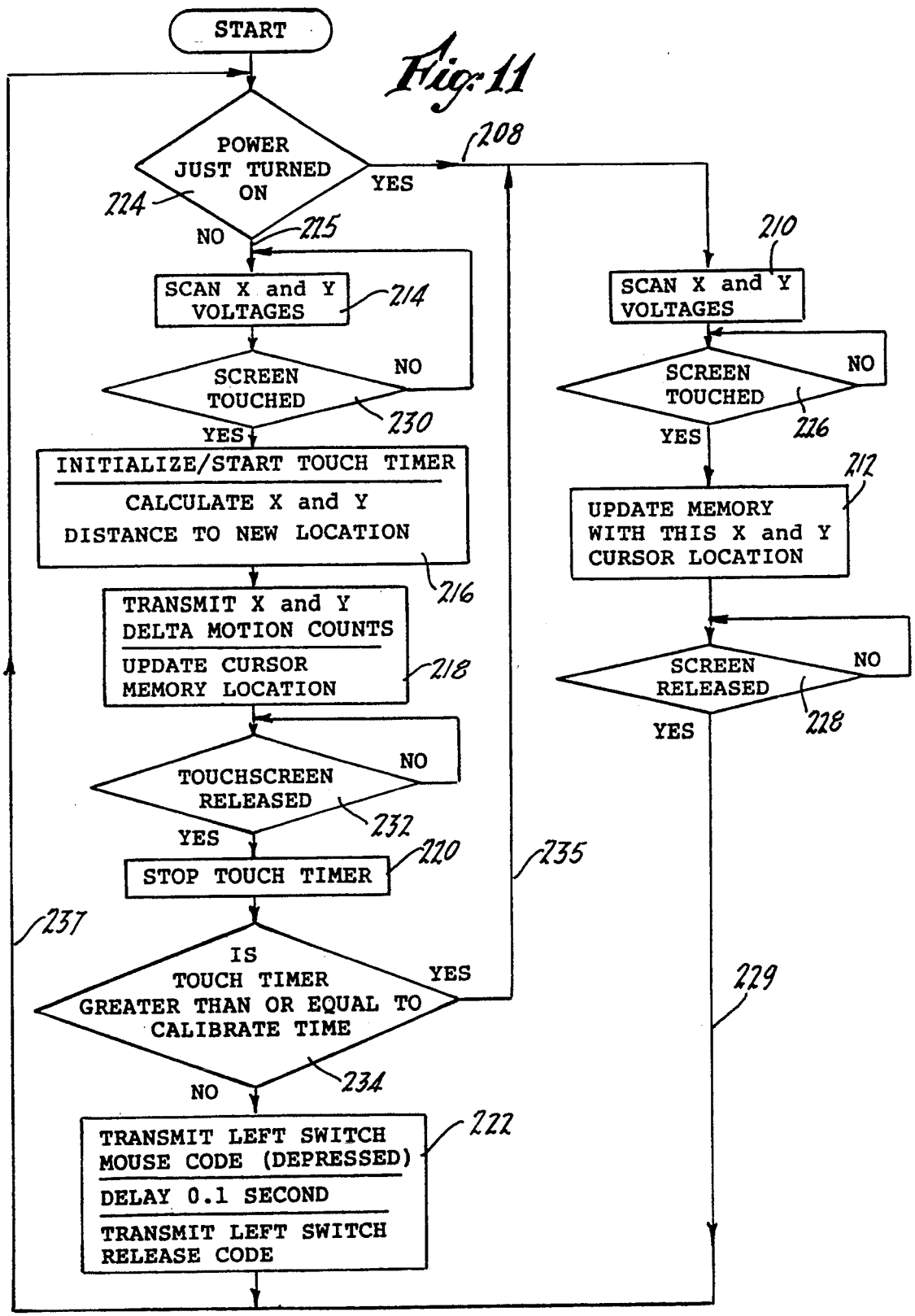

COMPUTER MOUSE SIMULATOR DEVICE

CROSS REFERENCES TO RELATED APPLICATIONS

The present application is a continuation-in-part of my application U.S. Ser. No. 07/726,389 filed Jul. 8, 1991, entitled COMPUTER MOUSE SIMULATOR DEVICE, now abandoned, and a continuation-in-part of my copending application U.S. Ser. No. 07/959,754 filed Oct. 13, 1992, entitled COMPUTER MOUSE SIMULATOR DEVICE. The present application claims priority under 35 USC 120, of both prior applications.

STATEMENT AS TO RIGHTS TO INVENTIONS MADE UNDER FEDERALLY-SPONSORED RESEARCH AND DEVELOPMENT

Research and development of the present invention and application have not been Federally-sponsored, and no rights are given under any Federal program.

BACKGROUND OF THE INVENTION

FIELD OF THE INVENTION

This invention relates to accessories for computers, and more particularly to devices for facilitating the movement of a cursor to a particular point or area on the screen of a computer monitor.

DESCRIPTION OF THE RELATED ART INCLUDING INFORMATION DISCLOSED UNDER 37 CFR §§1.97-1.99

Touchscreens have been employed successfully for a number of years in connection with the control of movement of a cursor over a CRT monitor of a computer.

In general, touchscreens of necessity require accompanying hardware and software, where the hardware can be either located on-board the computer, or else contained in an accessory unit having the capability of plugging into one of the computer's expansion slots.

A number of touchscreen devices are currently being manufactured and sold by Elographics, of Oak Ridge, Tenn. All employ a dedicated controller (hardware) which is plugged into a serial port or expansion slot of the computer. Another product manufactured by Elographics is a mouse emulator for Microsoft Windows applications. A touch panel is installed over the face of a display monitor. A ribbon cable runs from the touchscreen panel to a controller board, which can either be installed in an expansion slot, or in a small external box. The touchscreen controller processes the touches, including scaling and translating the touch location coordinates, and setting baud rates, if needed, for proper communication between the controller and the host computer, via the expansion slot.

Another mouse-type device, known by the name INTERACT, is produced by Nematron, of Ann Arbor, Mich. This is a combination of hardware consisting of a touchscreen and accompanying software. The unit features a three square inch touchpad that can be employed in place of the touchscreen. The various functions available on a touchscreen can be largely duplicated by the touchpad.

Still another touch-sensitive controller is that manufactured by Micro Touch Systems, Inc., of Wilmington, Mass., and known as UnMouse. It consists of a touch-sensitive tablet that enables control of movement of the cursor at a greatly increased speed. This device is intended to be installed in an expansion slot of an existing Mac or PC.

All of the touchscreens noted above require an electronic interface to convert the analog voltages produced by touching the screen into appropriate digital information. The circuitry which performs the conversion is, to the best of my knowledge, always either connected to a serial input/output port on the computer, or located on an expansion card inserted into one of several expansion slots usually provided in most PCs. In addition, special software is almost always required in order render these systems compatible with the particular PC being employed.

There arise a number of disadvantages with the existing approaches to cursor control involving touchscreens and/or touch-pad devices:

1. In particular, the required hardware to support such devices inevitably uses up at least one expansion slot of the machine, making this slot unavailable for other uses or applications. Alternately, the hardware must be connected to the serial input/output port of the computer.
2. Driver software must almost always be custom designed to each version of a particular PC in spite of certain similarities in PC hardware.
3. The necessity for use of additional software also results in a related tie-up of at least some of the useable memory or storage capacity, which is always considered a drawback.
4. The driver software must be checked for proper operation and compatibility with different application programs, in spite of apparent similarity in the PC hardware being employed.
5. Where touchscreens are mounted over the face of a CRT monitor, care must exercised in matching the curvature of the touchscreen to that of the monitor face. Since the monitor face is glass, and the touchscreen also employs a glass base, adjustment of this curvature is seldom, if ever, possible. As a result, the phenomenon known as parallax enters the picture, and control of the cursor through movement of the user's finger often becomes sloppy at best, resulting in poor resolution of movement and increased difficulty in use. Irritation and fatigue by the user is also commonly experienced.
6. In addition to the problems noted above in the previous paragraph, the relatively recent adoption of different screen sizes and configurations complicates the adaptability of touchscreens to a multiplicity of PCs, and thus a truly "universal" touchscreen adaptable to a wide variety of PCs is not available.
7. Where hardware manufactured by one company and software manufactured by a second company are combined, difficulties involving poor incompatibility or marginal compatibility are frequently present. Oftentimes the customer is left in somewhat of a dilemma, since his system may be down and neither manufacturer can, with definity, and charged with coming up with a "fix" to render the system operative, as a whole.

This potential incompatibility issue is especially true where the computer has a series of expansion slots and/or a serial input/output port, for connecting accessories to the computer.

8. Further, with some touchscreens that are applied directly over the front face of a monitor, the cursor jumps from a predetermined position to a point just beneath that where the user touches the screen, following which the user's view of the cursor can be often blocked by his own finger. The resulting resolution can be impaired, since it may be necessary to lift one's finger off the touchscreen, view the cursor, and make further corrections in its position by re-touching the screen.

9. Also, to the best of my knowledge, there do not exist any combination mouse port/touchscreen systems which automatically emulate or simulate activation of one or more switches corresponding to those of a mouse, by enabling the user to depress "key-input" locations disposed at particular areas of a touchscreen, as for example, at two or three locations along the bottom edge of a screen.

10. Prior mouse simulators in the form of touch key pads, have the disadvantage that if they are physically small, they have poor resolution; if they are large, they occupy too much desk space, thus sacrificing such space in return for improved resolution.

11. In general, with prior touchscreen systems, direct, absolute operator selection of a target (icon, menu, zone, etc.) on a computer display was not achievable without the use of special software which had to be loaded into the computer. The problem with prior mouse and prior touchscreen applications lies in the fact that they constitute relative-type pointing mechanisms which move the cursor incrementally in the X-axis and Y axis directions by a relative amount; in just about all cases with prior touchscreens, the touchscreen hardware/firmware had no way of determining the actual location of the cursor on the computer screen.

Use of a dedicated mouse port with industry standard, specially designed software drivers has not allowed absolute positioning, but rather moving of a cursor closer and closer to a desired target with the pointer, and then activating a switch to indicate to the computer that the correct position or spot had been selected. The only options previously available have been either to modify the software in the computer, or load in special drivers associated with the particular touchscreen system employed, and feed the drivers into an accessory or expansion slot of some type, typically necessitating access to the inside of the computer cabinet.

SUMMARY OF THE INVENTION

The above disadvantages and drawbacks of prior cursor control systems are largely obviated by the present invention which has for one object the provision of a novel and improved electronic computer mouse simulator which is both simple in its construction and reliable in its operation, and which can be readily connected to and employed with the dedicated mouse port of an existing computer without any modification to the computer's electronic hardware or its software. Service and installation of the monitor and computer are not affected, since the simulator can be readily unplugged from the mouse port connector receptacle, and a standard mouse substituted therefor.

Still another object of the invention is to provide an improved mouse simulator as above set forth, wherein there is absolutely no connection to either the conventional expansion slots or serial input/output port of the computer. In contrast, only the dedicated mouse port is used, thereby making available the serial port and all such expansion slots for other functions, such as expanded memory, back-up tape drives, interface connection to adjacent workstations, and the like. This guarantees compatibility with all future software of a type employing a mouse.

A still further object of the invention is to provide an improved mouse simulator in accordance with the foregoing, where no reliance is placed on use of any part of the computer memory, thus fully retaining such memory for other uses and applications.

Another object of the invention is to provide an improved mouse simulator as above described, which is inherently completely immune to compatibility problems that might otherwise arise between software and hardware associated with both the simulator and with the computer, since the computer "sees" no difference at its mouse port connector receptacle when the mouse simulator is used, as compared to when a conventional mouse is used. In this connection, troubleshooting is greatly simplified; should a problem of questionable origin arise, it is a simple matter to unplug the mouse simulator, connect a conventional mouse in its place, and thus determine with a high degree of certainty, the source of the problem, i.e. the simulator, or the computer itself.

Yet another object of the invention is to provide an improved mouse simulator of the kind indicated, wherein there is provided at the mouse port connector cable of the simulator, an essentially exact duplication of a mouse protocol by the simulator, namely binary information in serial format relating to X-axis and Y-axis movement obtained from a touchscreen positioned in front of or laterally of the computer monitor, as well as binary information in serial format relating to either single switch or multi-switch activation of a portion of the touch-screen corresponding to single switch or multi-switch activation of respective switches of a mouse useable with said mouse port.

. Yet another object of the invention is to provide a novel and improved mouse simulator as above, which takes full advantage of the ease of a touchscreen to control movement of a screen cursor, but which does so solely through connections made to the computer's existing dedicated mouse port.

A still further object of the invention is to provide an improved mouse simulator in accordance with the foregoing, wherein different modes of touchscreen operation can be utilized, including multiple cursor control modes such as absolute or proportional movement, and velocity control movement, and wherein there is built into the touchscreen, emulations of one or more switch functions of a conventional mouse.

Yet a further object of the invention is to provide an improved mouse simulator as above characterized, which is physically large in size so as to provide a desired, high degree of resolution and control, while at the same time not sacrificing, in the least, available desk space, since the touchscreen portion of the simulator can be mounted in front of the computer display screen, an area which is already available and has the physically large X and Y dimensions needed to accommodate a physically large touchscreen/mouse simulator. Thus, the simulator enjoys the advantage of high resolution with no loss in desk or table space. The same cannot be said of the existing touchpad devices or mouse emulators of which I am aware.

A still further object of the invention is to provide an improved mouse simulator of the kind indicated, wherein the undesirable effects of parallax are eliminated, and where less criticality is required as to physical dimensioning, curvature, and positioning of the touchscreen device. The latter can deviate in absolute size from that of the monitor screen, since both a relative and an absolute movement relationship exists between finger displacement and cursor movement. The touchscreen device can even be somewhat larger or smaller in its X-Y dimensions than those of the monitor screen, and the touchscreen device can be mounted an any flat surface either in front of the monitor screen, or displaced laterally therefrom (above, below, to the side, or even on another support or panel).

Thus a relatively few different touchscreen configurations are needed to accommodate a wide range and shape (curvature) of existing or future monitor screens.

Still another object of the invention is to provide a mouse simulator as above set forth, wherein in one embodiment, there is eliminated any need for the user to calibrate the simulator. Operational technique is readily assimilated by the user, and correction of operator-generated mistakes involves merely release of the touchscreen device, and re-application of the user's finger and movement thereof in appropriate compensating directions.

Yet another object of the invention is to provide an improved interface circuit for connection between a touchscreen device and a computer, which circuit provides an absolute positioning capability to the cursor via the touchscreen device, following an initial calibration routine. The calibration routine usually needs to be performed only once, after the equipment is initially turned on. Thus, from the operator's viewpoint, it appears that pointing to a selected display target (icon, menu, option, word, etc.) causes the computer to initiate an immediate action associated with that target, and thereby in effect providing an absolute touchscreen emulation but with a relative-type operating mode.

More importantly, by the invention, the interface can be plugged directly between the touchscreen device and the dedicated mouse port of the computer, with no additional software support for the computer; in operation, the touchscreen emulates mouse functioning but without the relative mode associated with the mouse; instead, there is provided an absolute mode of cursor positioning, by means of the present invention.

Stated differently, following initial calibration of the interface circuit, subsequent applications of the pointing device associated with the touchscreen device are interpreted as cursor movement commands, in such a way that the cursor immediately moves to the location substantially underneath or in back of the pointing device, these cursor commands having been converted to mouse-compatible protocol and fed directly into the dedicated mouse port of the computer.

The above objects are accomplished by an electronic mouse simulator for a computer having a dedicated mouse port connector receptacle, and a monitor with a display screen. The simulator comprises a touchscreen device adapted to be positioned in front of or laterally of the screen of the computer monitor. The touchscreen device further has an electrical output circuit characterized by an electrical parameter (a.c. and or d.c. voltage or current; resistance; impedance; frequency; pulse characteristic) which varies in accordance with the position of a pointer directed toward the front of the touchscreen device. The simulator further includes a multi-conductor cable and electrical connector carried thereby and adapted to be connected directly to the dedicated mouse port connector receptacle of the computer. There are provided electronic conversion means having input circuitry coupled to the output circuit of the touchscreen device, and for converting the parameter from the touchscreen device output circuit into binary format. The electronic conversion means has an output circuit for supplying data in this binary format. Finally, there are further provided additional electronic means including a programmed microprocessor having input circuitry connected with the output circuit of the electronic conversion means, the input circuitry receiving the binary format from the electronic conversion means output circuit, and the additional electronic means has mouse-compatible output circuitry adapted for direct connection to the dedicated mouse port of the computer. By the above arrangement, the mouse simulator essentially completely emulates, through the dedicated mouse port, control functions of a conventional mouse if the latter were to be connected to the mouse port and adapted for use with the computer.

The above objects are further accomplished by an electronic mouse simulator for a computer having a monitor with a display screen and a dedicated mouse port, the simulator comprising a resistive-type touchscreen device adapted to be positioned in front of or laterally of the screen of the computer monitor and having an expansive surface characterized by an X-axis and a Y-axis. The touchscreen device has front and back planes with single and multiple connections respectively. There is provided an analog-to-digital converter having input circuitry and output circuitry, with the input circuitry being connected to the front plane of the touchscreen device. Electronic means including a solid state multiplexer are connected to the multiple connections of the back plane of the touchscreen device, thereby to alternate the voltages applied to the back plane between vertical and horizontal directions. The arrangement is such that touching of the front plane impresses the alternate voltages on the input circuitry of the analog-to-digital converter. Additional electronic means including a microprocessor and a mouse interface driver are provided, the microprocessor being connected with the output circuitry of the analog-to-digital converter, for continuously monitoring the digital output thereof and for continuously converting digital signals received from the analog-to-digital converter to digital signals to be applied to the mouse driver. The mouse driver has an output circuit and transfers signals correlated to the location of the pointer on the touchscreen device, such signals emulating those produced by a conventional mouse connected to the dedicated mouse port of the computer as the mouse is moved in X-axis and Y-axis directions.

The objects are further accomplished by an electronic mouse simulator for a computer having a dedicated mouse port connector receptacle, the mouse simulator comprising a touchscreen device having an electrical output circuit characterized by an electrical parameter which varies in accordance with the X-axis and the Y-axis positions of a pointer directed toward the front of the touchscreen device, a multi-conductor cable and electrical connector carried thereby and adapted to be connected directly to the dedicated mouse port connector receptacle of the computer, and electronic means including an analog-to-digital converter having an input circuit connected with the touchscreen device output circuit, and having an output circuit. The electronic means includes a programmed microprocessor having input circuitry connected with the output circuit of the analog-to-digital converter, and the electronic means has output circuitry connected to the multi-conductor cable. The electronic means generates electrical signals which substantially emulate signals representing X-axis movement of an operative mouse normally connected to the mouse port connector receptacle when the pointer is moved in an X-axis direction, and which substantially emulate signals representing Y-axis movement of an operative mouse normally connected to the mouse port connector receptacle when the pointer is moved in a Y-axis direction, and the electronic means further transmits the signals through its output circuit and through the multi-conductor cable, to the dedicated mouse port connector receptacle of the computer.

The above objects are still further accomplished by an interface circuit for connection between a touch-screen device and a computer having a screen and a cursor moveable across the screen, the computer further having a dedicated mouse port receptacle, and the interface circuit comprising in combination means for connection to the output of the touchscreen device, to accept data therefrom corresponding to X-axis and Y-axis positions of a pointing device associated with the touchscreen device, manually-initiated calibrating means for correlating the initial position of the cursor of the computer screen, to X-axis and Y-axis based data received from the touchscreen device, and a memory, and means for storing in the memory, the X-axis and the Y-axis based data received from the touchscreen device. There are also provided means for discriminating between data received from the manually-initiated calibrating means, and data subsequently received from the touchscreen device and which has resulted from movement of the pointing device to a new position, and for producing voltages corresponding to the difference in this data as to both direction and displacement of the pointing device. Also included are means connected with the memory, for converting the difference voltages into mouse port compatible protocol signals, and means for transmitting the mouse port compatible protocol signals to the dedicated mouse port receptacle of the computer, such that the cursor on the computer screen, following initial calibration, subsequently moves so as to substantially underlie the said new position of the pointing device associated with the touchscreen device.

The objects are further accomplished by a microcomputer for connection between a touchscreen device and a computer having a dedicated mouse port receptacle, for positioning the cursor of the computer's display at a predetermined point with respect to the touchscreen device, the microcomputer comprising in combination means for correlating an initial calibrating positioning of the cursor with respect to a pointing device applied to a first position on the touchscreen device, means for discriminating between the initial calibrating positioning of the cursor, and subsequent positioning of the cursor as brought about by a subsequent movement of the touchscreen pointing device to a new, second position, and means for calculating the direction and distance between the said first calibrating position of the pointing device and the said new, second position of the pointing device on the touchscreen device. There are also provided means for converting the calculated direction and the calculated distance directly into mouse-compatible code signals that simulate movement of the cursor substantially in the said same direction and by an amount substantially equal to the distance, and means for feeding said mouse-compatible code signals into the dedicated mouse port receptacle of the computer so as to move the cursor in the direction corresponding to that of the pointing device, and by a distance corresponding to that transversed by the pointing device over the touchscreen device, the cursor subsequently occupying to the new position substantially underlying the pointing device on the touchscreen device.

The objects are further accomplished by a novel method, carried out employing an interface circuit for connection between a touchscreen device and a computer having a screen and a cursor moveable across the screen, the computer further having a dedicated mouse port receptacle. Specifically, the invention provides a method of implementing an absolute positioning of the cursor on the computer screen by means of a pointing device associated with the touchscreen device, the method comprising the steps of calibrating an initial position of the cursor on the computer screen, to correlate the initial position to X-axis and Y-axis based data in the touchscreen device, retrieving the X-axis and Y-axis based data from the touchscreen device, and storing the retrieved data in a memory of the interface circuit, applying the pointing device thereto to a random point on the touchscreen device, so as to cause the touchscreen device to produce new X-axis and Y-axis based data corresponding to the location of the random point, producing voltages corresponding to the difference in the data stored in the memory and the new data received from the application of the pointing device to the touchscreen device, as to both direction and displacement of the pointing device with respect to the initial position of the cursor, converting the difference voltages into mouse port compatible protocol signals, and finally transmitting the mouse port compatible protocol signals to the dedicated mouse port receptacle of the computer. The arrangement is such that the cursor on the computer screen, following initial calibration, moves in succession to different points that substantially follow and underlie the pointing device associated with the touchscreen device.

Other features and advantages will hereinafter appear.

BRIEF DESCRIPTION OF THE DRAWINGS

In the drawings, illustrating a preferred embodiment of the invention:

FIG. 2 is a schematic circuit diagram of the mouse simulator of the invention, illustrating particularly a touchscreen device and electronic interface circuitry employed in carrying out the invention.

FIG. 6 is a side elevation of an electrical connector as employed with the mouse simulator, and which connector is adapted for direct connection with the dedicated mouse port electrical connector receptacle of the computer.

FIG. 7 is an algorithm or flow chart, setting forth in general terms, the mode of operation of the mouse simulator of the invention, and from which there was prepared a program for loading into a microprocessor of the EPROM variety and which is employed in the interface circuitry of the invention.

FIG. 11 is an Algorithm or flow chart, setting forth in general terms, the mode of operation of another embodiment of the invention, involving the utilization of a touchscreen device and interface, to achieve absolute positioning of a cursor from information received from the touchscreen device, and wherein the sole electrical connection of the interface to the host computer is through the computer's dedicated mouse port connector receptacle.

DESCRIPTION OF THE PREFERRED EMBODIMENTS

Figure 1:
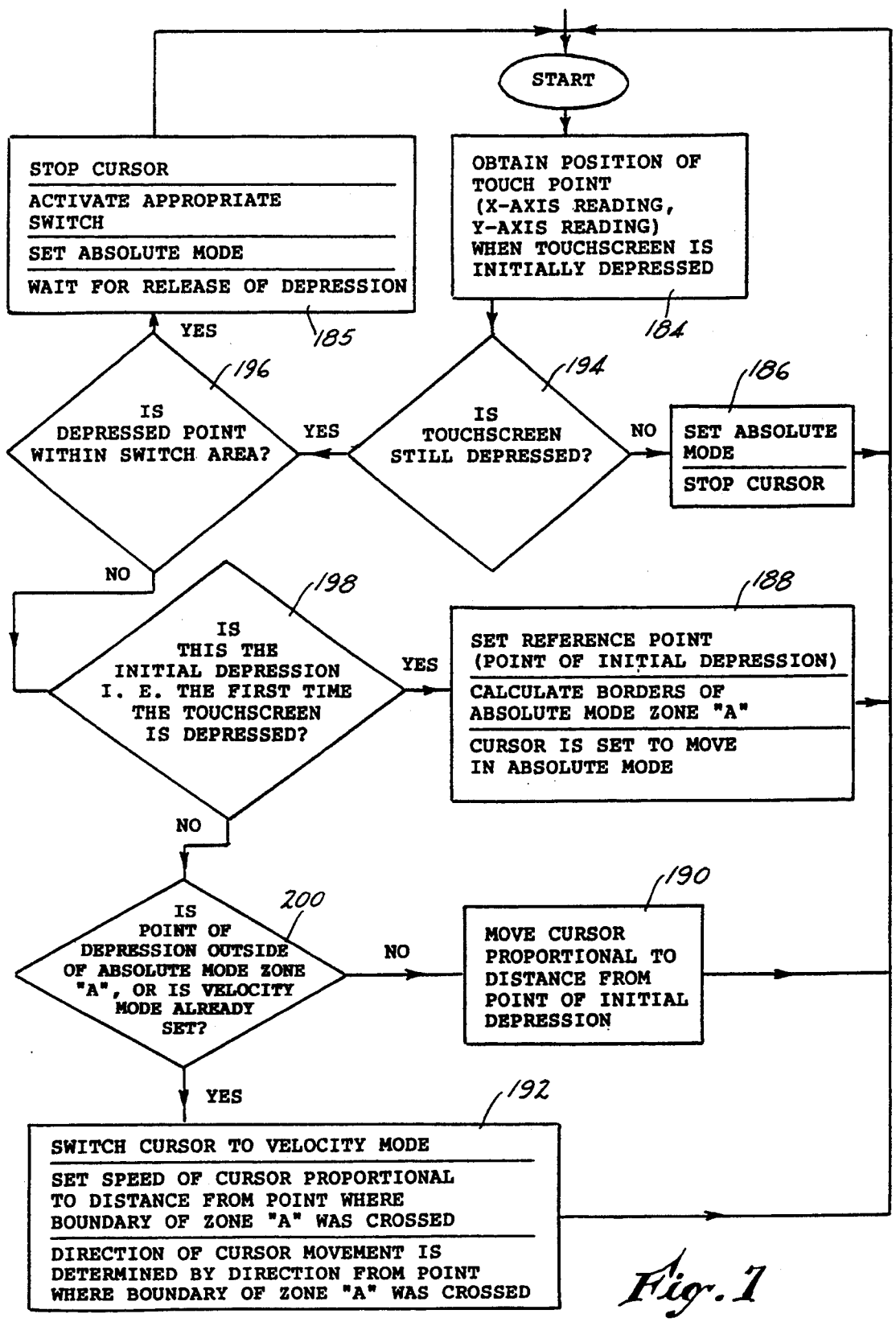
FIG. 1 is a simplified block diagram of a computer and display monitor, having a touchscreen device of a type adapted to overlie a curved monitor screen, the touchscreen device being mounted in front of the screen and coextensive therewith.

Referring first to FIG. 1, there is illustrated a computer and monitor having an expansive display screen 16, the computer having the usual mouse-compatible hardware, and in addition, conventional mouse-compatible software installed therein, the computer being shown diagrammatically and being generally designated by the numeral 10. The monitor is indicated at 12. A multi-conductor cable 14 extends from the monitor to the computer, which latter may contain one or more serial input/output ports, one or more internal expansion slots, and optionally, additional connections for a modem, keyboard, printer and other accessories (not shown). The CRT containing the screen 16 is mounted in the monitor 12. A touchscreen device 24 is shown directly overlying the screen 16.

Figure 8:
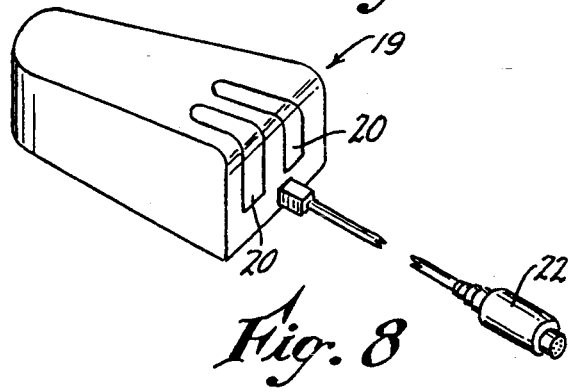
FIG. 8 is a perspective view of a conventional or generic mouse and electrical connector of a type adapted to be connected to the dedicated mouse port of the computer. The mouse simulator of the invention is intended to be a direct substitution for this mouse, the connector of FIG. 6 being directly substitutable for the connector of FIG. 8.

The present invention concerns a touchscreen device for use with the existing monitor, and an interface unit which connects between the touchscreen device and the dedicated mouse port of the computer, and which interface unit transmits to and/or receives from the dedicated mouse port, signals which substantially completely emulate those which are characteristic of a conventional mouse, and which signals are correlated to and result from specific events which occur at the touchscreen device. A conventional mouse is illustrated in FIG. 8 and designated by the numeral 19. It has mouse switches 20, a multi-conductor cable, and a connector 22 which is normally adapted for connection to the dedicated mouse port connector receptacle of the computer.

By a unique combination of firmware and hardware in the interface, as will be described below, movements of a pointing device such as a user's finger, glove, wand or other pointing instrument, over a field of travel such as the touchscreen device surface, as well as over predefined areas of the touchscreen device, are converted to a digital format which substantially completely simulates or emulates that of mouse, and thus such digital format is directly communicatable with a dedicated mouse port as mouse port-compatible signals from the interface. The signals direct the computer to move the display screen's cursor in accordance with and in direct correlation to the designated activity at the touchscreen device. More specifically, the interface in effect converts the touchscreen device signals to standard mouse-protocol signals, and sends/receives such signals to and from the dedicated mouse port connector receptacle of the computer, without the need for modifications of any other kind to the computer, be it software, hardware, firmware, or internal or external connections to expansion slots or serial ports thereof.

Figure 3:
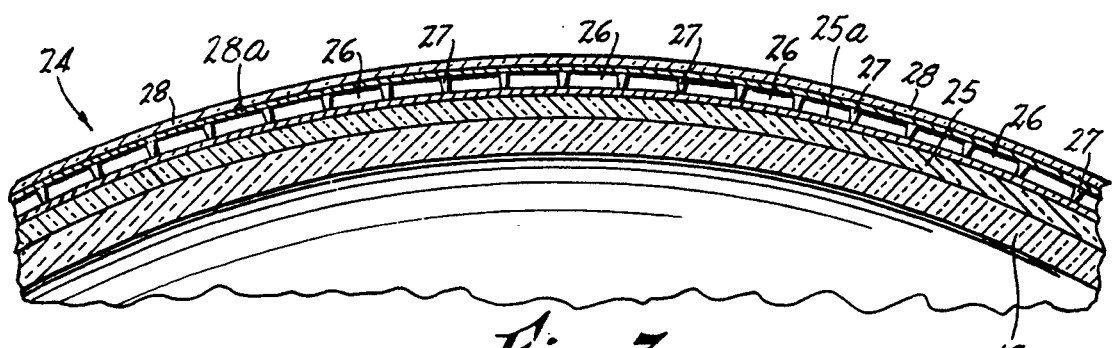
FIG. 3 is a fragmentary view, partly in elevation, and partly section, showing details of the contoured or curved touchscreen device of FIGS. 1 and 2.

Reference will now be made to FIGS. 2 and 3, FIG. 2 illustrating a schematic circuit diagram of the interface unit and touchscreen device, and also the electrical leads constituting the direct connections to the dedicated mouse port connector receptacle of the computer.

The touchscreen device is diagrammatically indicated at 24 in FIG. 2, and is described hereinbelow as an example of one type of touchscreen device which can be used in carrying out the present invention. The touchscreen device 24 illustrated is of the resistive-overlay type, and is depicted in fragmentary section in FIG. 3.

Other types of touchscreen devices could be employed in place of the resistive-overlay type, as for example, scanning infrared beam, capacitive overlay, and surface acoustic wave (SAW) types. Also, perfectly planar touchscreen devices could be used, since it is not necessary to match the monitor's screen curvature as has been illustrated in FIG. 3.

Referring again to FIG. 3, the resistive-overlay touchscreen device 24 comprises a glass base layer 25 which can directly overlie the display monitor screen 16, the base or back layer 25 incorporating a first thin transparent or see-through electrically conductive metallic coating 25a applied to its upper surface in the figure, an air gap 26 which contains a plurality of uniformly spaced insulators 27, and a clear or see-through flexible front layer 28, having on its underside a thin transparent or see-through electrically conductive metallic coating 28a similar to that on the front of the base layer 25. The insulators 27 are constituted of plastic, and in the absence of pressure applied to any point on the front layer 28, the two metallic coatings are maintained in spaced relation and electrically insulated. A slight pressure applied to any point on the front layer 28 results in a minute deflection of the layer such that the metallic coating thereon comes in contact with the metallic coating on the back layer 25.

By alternately applying X-axis and Y-axis voltages to one vertical edge and one horizontal edge of the back layer 25, voltage gradients are set up in this layer, and when the metallic coating of the front layer 28 comes into contact with the coating of the back layer 25, the magnitudes of the voltage gradients provide an indication of the exact location of the point being depressed, in both an X-axis and a Y-axis direction. Stated differently, touching the touchscreen device 24 at any particular location produces a pair of analog voltages, which can be considered as constituting an electrical output parameter of the touchscreen device, representing respectively X-axis and Y-axis coordinates of the point of contact. This information is in turn converted into binary format which is employed to generate the signals necessary to feed directly into the dedicated mouse port connector receptacle of the computer, as will be explained below.

While the touchscreen device is illustrated in FIG. 3 as being installed directly on the monitor screen, the touchscreen device could alternately be mounted in a position space from the screen, and either in front of or displaced laterally therefrom. As another possibility, the touchscreen device 24 could be located remotely from the screen 16, i.e. above or below it, as for example in a standard rack panel.

As noted above, FIG. 2 illustrates, in addition to the touchscreen device 24, the electronic interface means or interface circuit which adapts the touchscreen device signals to mouse port-compatible format. The interface means employs a microcomputer or microprocessor 32 which serves essentially two functions: 1) to generate a multiplexing signal for use in driving the touchscreen device 24; and 2) to process digital signals that are indicative of the activity which occurs at the touchscreen device 24 and to convert them to mouse-compatible format or protocol on an electrical cable that is suitable for direct connection to a mouse driver circuit whose output connects with the dedicated mouse port connector receptacle of the computer. The microcomputer or microprocessor 32 has power supply connections 34, 36, and also a reset terminal 38 connected to a delay circuit 40, 42, such that when power is initially applied, the reset terminal 38 is initially held near ground until stability in the microprocessor is established. Terminals 44 and 46 are connected to a circuit containing a crystal 48 and capacitors 50, 52, the crystal being employed in an oscillator contained in the microprocessor and which provides a high accuracy clock signal to the unit and also synchronizes communication between it and an analog-to-digital converter to be described below.

Various active and passive electrical components of FIG. 2 include supply voltage connections which, in the present interface, are ground and +5 volts, respectively. The latter are indicated in the drawing by the designation "+5 V", at the appropriate locations.

In connection with the multiplexing function of the microprocessor 32, there are generated internally, complementary, synchronized square wave signals on leads 54 and 56. Resistors 58 and 60 are for biasing purposes. The outputs on leads 54 and 56 are in turn fed to buffer stages 62, 64 and 66, 68. Resistors 70, 72, 74 and 76 are also for biasing. Resistors 78, 80, 82 and 84, capacitors 86, 88, 90 and 92, and diodes 94, 96, 98 and 100 are for filtering against transients, and complementary transistors 102, 104 and 106, 107 constitute drivers for the touchscreen device 24. Resistors 108 and 109 constitute loads, respectively. Essentially the function of the circuitry disposed between leads 54, 56, and the touchscreen device 24, is to boost the output current capability of the microprocessor 32 to a level sufficient to drive the back layer 25 of the touchscreen device 24. Disconnect plugs and jacks 110, 112 and 114 are optionally provided between the touchscreen device 24 and the interface circuitry.

The amplifiers indicated by the numerals 62, 64, 66 and 68 can be conventional operational amplifiers/comparator switches, and are not critical as to component type. All four units are preferably contained in a single package.

The square wave output on lead 54 is typically 500 Hz, with the length of each cycle thereby being on the order of 2 msec. or so.

A similar signal appears on lead 56, 180° out of phase with that on lead 54.

The output signals from complementary transistors 102, 104 and 106, 107, having the square wave forms indicated above are applied to opposite corners of the back layer 25, to produce X-axis and Y-axis voltage gradients thereacross.

When a point on the front layer 28 of the touchscreen device 24 is depressed, the layer 28 senses the 500 Hz square wave. Due to the gradients across the touchscreen device back layer 25, the voltages on each half cycle of the square wave are reduced to values between zero and +5 volts, such values respectively indicating X-axis and Y-axis coordinates of the point of depression of the front layer 28. Movement of the point in an X-axis direction will thus affect the value of those half cycles corresponding to X-axis location, and movement of the point in a Y-axis direction similarly affecting the value of those half cycles corresponding to Y-axis location.

Each point on the touchscreen device 24 thus gives rise to a unique value of X, Y coordinate voltages on an output line or output circuit 116 of the touchscreen device 24.

The voltage on line 116 is then applied to the input 118 of an analog-to-digital converter designated 120. A biasing resistor 121 extends to +5 volts, as shown. The analog voltages represented by the square wave input to the A-D converter 120 are thereby converted into serial binary form, with the resulting data still representing X and Y coordinates of the point of depression on the touchscreen device 24.

The analog-to-digital converter 120 can be of a type identified by the number AD0833, manufactured by National Semiconductor. The pin numbers within the box correspond to those of this unit.

Multiple interconnections 122, 124, 126, 128 and 130, between the A-D converter 120 and microprocessor 32 are provided. Line 122 is identified as a "chip select" line, and carries either a zero or +5 volt level, depending on the type of A-D converter employed; line 124 is a clock, to provide synchronization of data transmitted from the A-D converter 120 to the microprocessor 32. Lines 126 and 128 are identified as "data in" and "data out" lines respectively, carrying the information relating to the X and Y coordinates indicated above. Finally, line 130 is identified as a "SARS" output from the A-D converter, which provides information to the microprocessor 32 relating to completion of the transmission of data from the A-D converter to the microprocessor.

The nature of the signal on line 128 is an 8 bit word representing the X and Y coordinates of the point on the touchscreen device 24 which is being depressed. This signal is converted in the microprocessor 32 to an output signal, in serial binary format. Because the voltage levels of this output are in the present instance, restricted to values between zero and +5 volts, as dictated by the power supply with which the microprocessor 32 is employed, a mouse driver circuit 132 is preferably employed to convert TTL/CMOS input signals into RS-232 output signals (or vice-versa), the RS-232 format being characteristic of a majority of existing mouse port protocols, and having become, to a large extent, standard throughout the industry.

The mouse driver 132 can be of a type identified by the number MAX232, manufactured by Maxim Integrated Products. The pin numbers in the box correspond to those of this unit.

Figure 9:
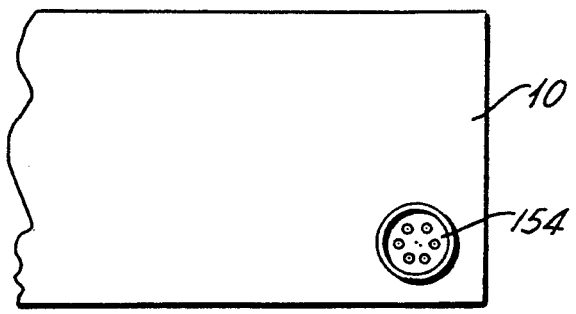
FIG. 9 is a fragmentary elevation of the rear panel of the computer, and illustrating its dedicated mouse port connector receptacle.

Data lines extending between the microprocessor 32 and the driver circuit 132 are indicated 134, 136, 138 and 140. The converted lines 142, 144, 146 and 148 are electrically mouse port compatible, making up a composite cable 150, FIG. 6, having an electrical connector 152 that is adaptable to be directly plugged into a dedicated mouse port connector receptacle on the computer. Such a dedicated mouse port connector receptacle is illustrated in FIG. 9, designated 154, which is usually at the rear panel of the computer 10.

The microprocessor 32 employed in the interface of FIG. 2 is a unit known as a Single-Component 8-bit Microcomputer (EPROM-externally programmable read only memory) known by the designation 87C51, and manufactured by Intel. It is encased in a sealed, ceramic, 40 lead DIP which includes a window that allows for programming and erasure, which are accomplished by ultraviolet light. The pin numbers shown within the box correspond to those of this unit. The particular techniques involved with converting a program contained on a magnetic disk to ultraviolet light and "burning" (entering) the resultant program into the EPROM are performed on a device known as a PROM (Programmable Read Only Memory) programmer. This procedure per se is known in the art.

In the interest of providing a full and complete disclosure to enable anyone skilled in the art to make and practice the invention, there is annexed hereto a copy of the Source Code corresponding to the program above described and which has been entered into the microprocessor 32. This Source Code is an Assembly Language Program entitled "JV5", and would be used to set up the system to emulate a generic mouse. The program was created by the inventor and was entered, via keyboard, into an IBM compatible PC. A print-out of this resulting Source Code that embodies the Algorithm of FIG. 7 is given in Appendix A attached hereto.

The data format for the "generic" mouse referred to above is an industry standard for a mouse protocol, now in the public domain, and which was originally developed by Mouse Systems Corporation.

The data in the form of the Source Code, while being entered into the PC, is stored on a magnetic diskette. This information on the diskette is thereafter converted, by known techniques, to a data-address file, known in the industry as a Hex file. A print-out of this Hex file is given in Appendix B attached hereto, and constitutes the specific data bytes and their corresponding addresses that were entered, by the inventor, into the 87C51 microprocessor in order to implement the Algorithm illustrated in FIG. 7, and by which the microprocessor 32 is enabled to convert the X, Y coordinate data from the touchscreen device into a format which is suitable for direct connection to the dedicated mouse port connector receptacle of the computer. The title of the Hex file is "JV5.HEX".

The information that is programmed into the EPROM can best be set forth by the Appendix B print out of this Hex File, which as noted above, gives the actual address of each data byte in the programmed EPROM.

By way of explanation, hex file numbers have a base of 16, instead of the usual decimal system. Specifically, decimal numbers 1, 2, 3, 4, 5, 6, 7, 8 and 9 correspond to Hex-base numbers 1, 2, 3, 4, 5, 6, 7, 8 and 9, respectively. Decimal numbers 10–15 correspond to hex designations A, B, C, D, E and F, respectively. Hence the decimal number 11 would be identified by a hex designation 0B, the decimal number 15 by the hex designation 0F, and the decimal number 16 by the hex designation 10.

In the Hex file, each line begins with a colon. The following two digits are known as a header and identify the number of bytes of information which follow and which are contained in this line.

In line 1 of the Hex file, the 3rd–6th digits identify, in the EPROM, the memory location, 0000, of the first data byte which follows, and which is given by the 9th and 10th digits. The 7th and 8th digits are all zeros, and constitute a boundary, but have no other significance. The 9th and 10th digits constitute the first byte of data, 01, entered into the first address, 0000. The 11th and 12th digits constitute the second byte of data, 55, entered into the second address, 0001. The last two digits are known as a check sum, AB, which are used to verify the information contained in the line.

As a further example, in line 2, the 0B indicates that a total of 11 bytes of information is set forth in the line, beginning at location 00B0. The 11 bytes are, respectively, B2 at location 000B; 95 at location 000C; 75 at location 000D; and 8A, D2, 30, 95, 02, D2, 16, and 32, respectively at the next 8 following locations. F1 represents the check sum. The following lines are interpreted in a similar manner.

A discussion of the operation of the touchscreen device 24 and interface circuit will now be given, with later reference being made to the Algorithm illustrated in FIG. 7.

Figure 4:
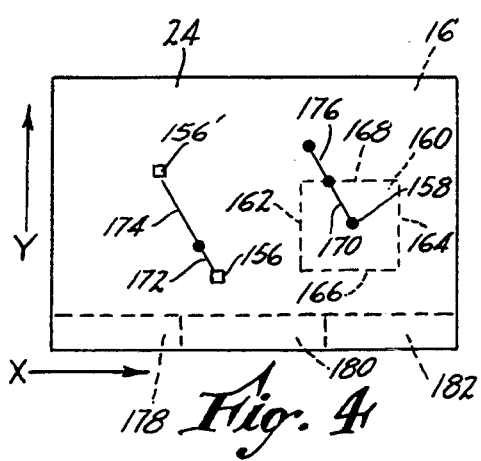
FIG. 4 is a front elevation of the touchscreen device, shown mounted in front of the computer monitor display screen, and illustrating one example of cursor movement control as provided by the invention.

FIG. 4 shows the touchscreen device 24 mounted in front of the screen 16 of the computer monitor 12. X and Y axes are diagrammatically illustrated. The cursor 156 is shown as a small box. According to the Algorithm and resulting program that has been entered into the microprocessor 32 of the interface, operation is as follows: No movement of the cursor occurs if the touchscreen device 24 is not being depressed. (Hereinafter, the term "depress" as applied to resistive overlay touchscreen devices can be thought of as an "activation" of the touchscreen device in general. With different types of touchscreens, such activation need not be made by physical contact with the screen itself, as for example, in the case where a scanning infrared beam device is being employed.) It is intended that the present invention not be restricted to the use of a resistive-overlay touchscreen device, although as presently understood, this type is the most applicable for use in the present invention, as compared to other currently available units.

At such time that it is desired to move the cursor 156, the following sequence is enacted. When the touchscreen device 24 is depressed initially at any random point thereon, as by the user's finger 23, FIG. 10, a reference point 158 identified by an X, Y coordinate pair is established and stored in the microprocessor 32.

If no movement of the finger occurs, the cursor 156 remains stationary in its original position.

At the same time that the reference point 158 is established, a well-defined zone, hereinafter referred to as an "absolute mode zone" is also established, surrounding the reference point and having the reference point 158 disposed at the center of the zone. The zone is indicated in dotted outline at 160, and defined by a pair of spaced X-axis coordinates 162, 164, and a pair of spaced Y-axis coordinates 166, 168. In the illustrated embodiment, this zone 160 is rectangular (square), and can be 2 inches high by 2 inches wide. If the operator "drags" his finger within this initially-established zone 160, the direction of movement of his finger will cause a corresponding movement of the cursor 156 in the same direction, i.e. the X-axis and the Y-axis components of finger displacement will cause proportional X-axis and Y-axis movements of the cursor. This correspondence applies to both straight line displacement, and displacement along any type of curved path.

In the present example, displacement of the user's finger along the line segment 170 has caused a proportional movement of the cursor 156 along the line segment 172.

Following the initial depression of the screen and establishment of the reference point 158, either of two subsequent events may occur. The operator may lift his finger from the touchscreen device prior to its having left the "absolute mode zone" 160, in which case the cursor 156 stops at the point it occupied when the finger was lifted. Alternately, the user may continue to "drag" his finger so that it crosses one boundary 168, for example, of the initially-established "absolute mode zone" 160; under such circumstances, the program in the microprocessor 32 calls for a conversion in the nature of relative movement between the cursor 156 and the finger from one of proportional displacement, to one where the cursor 156 now moves at a velocity which is proportional to finger displacement. This movement outside the "absolute mode zone" 160 is referred to as movement of the cursor 156 in the "velocity mode". In such case, the movement of the cursor 156, as to direction, follows that of the finger to a location 156'. The cursor 156 will now move along the line segment 174, to location 156', at a velocity that is proportional to the displacement of the user's finger along the line segment 176. Note that segment 174 is longer than segment 176 because of the switching from the "absolute mode" to the "velocity mode", which results in a relatively greater movement of the cursor for a given finger displacement. This "velocity mode" thus is of advantage where it is desired to move the cursor quickly from one area of the screen to another.

Figure 5:
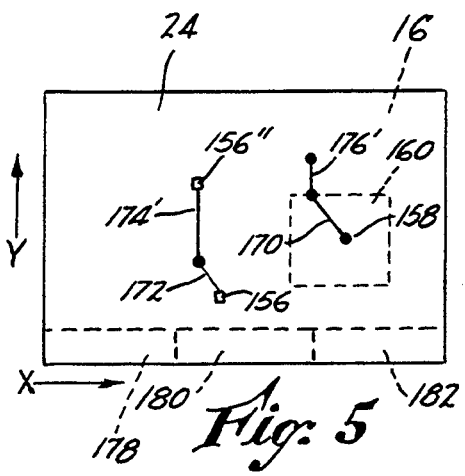
FIG. 5 is a view like that of FIG. 4, and showing another example of cursor movement control as provided by the invention.

As another example, in FIG. 5 there is illustrated again the touchscreen device of FIG. 4. Upon initially depressing the touchscreen device at location 158, a reference point is automatically established at point 158 and an "absolute mode zone" 160 also established and stored in the microprocessor 32. Assuming that the user displaces or drags his finger along the segment 170 in FIG. 5, the cursor 156 will correspondingly move along the line segment 172. When the finger displacement reaches the boundary of the zone 160, if the user now changes direction and displaces or drags his finger along the segment 176', the cursor 156 will move along the segment 174' at a velocity which is proportional to the finger displacement along segment 176'. This cursor movement is according to the "velocity mode" until the finger is lifted. The direction of movement of the cursor is the same, with respect to X and Y axes, as the direction of finger displacement.

The program is arranged to operate in a continuous loop which, as can be seen in the Algorithm of FIG. 7, always begins at the oval labelled "start", upon start up of the equipment, or upon the user removing his finger from the touchscreen device 24.

It is noted that prior to initial depression of the touchscreen device the cursor is stationary on the display screen 16, and that it remains stationary at the moment that the touchscreen device 24 is first depressed. Movement of the cursor 156 does not commence until the user drags his finger along the touchscreen device 24.

Also, it is to be emphasized that with the arrangement of this embodiment of the present invention, it is of no significance as to what point on the touchscreen device 24 is chosen to be the point of first depression. The program accommodates any point on the screen (with the exception of three special zones to be described below) as a reference point 158, unlike many other touchscreen device applications, where the cursor usually jumps to the area directly underneath the user's finger when the touchscreen device is depressed. Along with the establishment of the reference point 158, there is automatically defined the "absolute mode zone" 160 surrounding this reference point, as noted above, and movement of the user's finger within this zone 160 results in movement of the cursor 156 in the "absolute mode", i. e. cursor movement proportional to displacement of the user's finger, and in the direction of the displacement of user's finger. On the other hand, movement of the user's finger across any of the four boundaries of the zone 160 results in an automatic conversion of cursor movement to the "velocity mode", i. e. the cursor 156 moves at a velocity which is proportional to finger displacement as long as the finger is not lifted.

Further in accordance with the invention, there are provided at one, two or three locations on the touchscreen device, what are termed "mouse switch zones". In the present embodiment, three such zones 178, 180 and 182 are provided along the lower edge of the touchscreen device 24, and each has a vertical dimension of about ¾ inch, and a horizontal width of about 3 to 3½ inches, for a touchscreen device having an 8×11 inch size. The three zones are illustrated in FIGS. 4 and 5.

The Algorithm and program are arranged to recognize depression of the touchscreen device in any of these three zones, as the equivalent of a mouse "switch" function. Typically mouse devices incorporate two manually activated switches as at 20 in FIG. 8, some of the more sophisticated devices incorporating three.

In the Algorithm, these zones are collectively referred to as a "switch area".

As an example, if the user depresses a point on the touchscreen device which is outside of this "switch area", then cursor control proceeds as outlined above, namely, cursor movement within the "absolute mode zone" being proportional to finger displacement, and cursor movement outside this "absolute mode zone", being in a "velocity mode". After the cursor has arrived at the desired location, a mouse switch closure can be simulated by the user merely lifting his finger off the screen and momentarily depressing the desired area of the screen corresponding to mouse switch zone 178, 180 or 182. The program automatically converts this depression into a signal that is fed to the dedicated mouse port connector receptacle 154, and which is read by the mouse port and computer as a mouse switch closure, not the screen depression which actually initiated it.

As an illustration of the various possible activities which can occur at the touchscreen device, several examples of operation will be reviewed, and with reference to the Algorithm of FIG. 7.

The boxes in the Algorithm of FIG. 7 are labelled 184, 185, 186, 188, 190 and 192, respectively, and the diamonds labelled 194, 196, 198 and 200, respectively. Diamonds represent inquiries, whereas boxes indicate actions taken by the program in response to a "YES" or "NO" answer to the inquiry set forth in the respective diamond.

From the oval legend "START", referring to the box 184, when the touchscreen device 24 is first depressed at any random point (above the mouse switch zones 178, 180, 182), a reading of the location of the depression by X-axis and Y-axis coordinates is taken, and stored in the microprocessor 32 for use as the initial reference point 158. If the user lifts his finger immediately, or only after a short movement, then the answer to the inquiry in the subsequent diamond 194 is "NO"; box 186 indicates the result, namely that the program then halts the cursor, and readies it for subsequent movement in solely an "absolute mode". Then the program reverts to the starting point, in readiness for the next depression.

On the other hand, if the user depresses the screen and holds it, then the response to the inquiry of diamond 194 is YES, and as a result the subsequent diamond 196 queries whether this depression is within the mouse switch area 178, 180 or 182, or not. If the response to this inquiry is YES, as a result of the depression being in the switch area, then according to box 185, the cursor 156 is halted, the appropriate signal indicating activation of a mouse switch sent to the mouse port 154 of the computer, and the program set in an "absolute mode" in readiness for the next depression, after the depression of the switch area is released.

Alternately, if the (continued) depression is not in the switch area, then the answer to the inquiry in diamond 196 is NO; the program then inquires if the depression is the first time the touchscreen device is depressed. In response to a YES answer, box 188 indicates that the program then sets the initial point of depression as the reference point, establishes the boundaries of the "absolute mode zone" 160, and directs the cursor 156 to move in the absolute mode. In response to a NO answer, the program queries whether the point of depression has moved outside of the "absolute mode zone" 160, as by the user dragging his finger. In response to a NO answer, the cursor would continue to move with finger displacement in an "absolute mode", as indicated by box 190. In response to a YES answer, box 192 indicates that the program would switch the cursor movement to a "velocity mode", wherein the cursor 156 would move with a velocity that was proportional to finger displacement measured from the boundary crossing, as opposed to moving a distance that was proportional to finger displacement. Naturally the user can watch the cursor as it is being moved, and adjust his finger displacement as needed, to produce the desired response.

It is to be noted that in an "absolute" mode, the cursor 156 can be made to move a distance which differs from a strict 1:1 relationship to finger displacement, i.e. the program can be set so that a finger displacement of 1 inch corresponds to a cursor displacement of 0.25 inches, a 4:1 ratio, for example. Other ratios can be chosen and incorporated in the program, to achieve different degrees of control, and depending on the requirements of resolution of movement of the cursor. If a high degree of precision in the positioning of the cursor were desired, the program could be set for a high ratio of finger displacement to cursor movement, to permit precise positioning of the cursor on the display screen.

The invention also embodies a novel and improved method of controlling the movement of a cursor by means of a touchscreen device, as set forth below, and with reference to FIGS. 1, 2, 4, 5, and 10: In a computer 10 having a monitor 12 with a display screen 16; a touchscreen device 24 having an expansive working surface and a pointer or pointing means 23 moveable over the surface along X-axis and Y-axis directions; and an electronic interface circuit 120, 32 connected between the touchscreen device 24 and the computer 10; the method of controlling the movement of a cursor 156 on the display screen 16, which comprises the steps of establishing a reference point 158 on the touchscreen device 24, when the pointing means 23 is initially introduced to a random point on the screen 24, said reference point 158 being characterized by an X-axis coordinate and a Y-axis coordinate, storing the X-axis coordinate and the Y-axis coordinate corresponding to said reference point 158 in said interface circuit 32, 120 as long as said pointing means 23 remains in sufficiently close proximity to the screen 24 to continue influencing it, generating a signal in the interface unit 32, 120 which identifies by coordinate, any displacement of the pointing means 23 from the coordinates of the reference point 158, and feeding the signal to the computer 10 to instruct the computer to move the cursor 156 in the same direction as the displacement of the pointing means 23, and also to move the cursor 156 by a distance which is proportional to the displacement of the pointing means 23, measured from said reference point 158, and halting movement of the cursor 156 either when displacement of the pointing means 23 stops, or when the pointing means 23 is withdrawn out of proximity to the screen 24.

In the method of the invention, the cursor 156 remains motionless when the pointing means 23 is first introduced to the screen 24, and prior to any displacement of the pointing means 23. Also, according to the method of the invention, any point on the screen 24 can be selected as the initial reference point 158, such point being identified by a particular X-axis coordinate and a particular Y-axis coordinate.

Also by the method of the invention, there is established along with the definition of the reference point 156, an "absolute mode zone" 160 which is preferably a rectangular or square imaginary box that surrounds the reference point 156 and which has for its center the said reference point. When pointer 23 moves within this zone 160, the cursor moves a distance which is proportional to the displacement of the pointer 23 from the reference point 158. If the pointer is dragged across a boundary of this zone 160, the cursor is directed to move at a velocity which is proportional to the displacement of the pointer 23, measured from the boundary, and in a direction corresponding to that of the pointer 23.

By the invention, if the pointer 23 is withdrawn from the screen 24, the cursor is automatically halted; upon re-application of the pointer 23 to the screen 24, there is automatically established a new reference point 158 according to the approach of the pointer 23 to or onto the screen 24, and a new zone 160. Subsequent movement of the pointer 23 on or over the screen 24 results in either proportional movement of the cursor 156, or "velocity mode" movement of said cursor.

The invention as illustrated and described has the following important advantages. First, the mouse simulator of the invention combines the features of high resolution obtainable by a touchscreen device without sacrificing table or desk space, as would be the case with a conventional mouse simulator. Since the area in front of the computer monitor is already available, locating the touchscreen device at this area in effect frees the space which would otherwise be required in order to operate a conventional mouse or mouse simulator touchpad.

Since the touchscreen device/interface circuit of the invention plugs directly into the dedicated mouse port of the computer and communicates with the port in the exact protocol as would a conventional or generic mouse, absolutely no additional or special software is required for the computer in order to support the simulator. This is a distinct improvement over prior systems, which almost always required additional adaptive software.

Further, no hardware changes are required to be made in the computer. All of the hardware that is employed with the simulator of the present invention is outboard of the computer, and can be conveniently mounted in a small package, in-line with the connections between the touchscreen device and the mouse port connector plug 152.

Troubleshooting is simplified with the present arrangement. If problems occur, it is merely necessary to unplug the touchscreen device connector 152, and substitute a conventional mouse, FIG. 8, in order to determine the nature of the problem, i.e. is the problem with the touchscreen circuitry, or is it in the computer hardware/software itself?

Also, with the present invention, problems which occurred with prior touchscreen devices and which involved parallax are completely avoided. The present arrangement is not affected by parallax. In fact, the touchscreen device of the present invention does not necessarily have to be mounted directly over the monitor screen. It can be displaced laterally therefrom (above, below, left, right), with no sacrifice in operation. Also, it could be located remotely from the screen, as for example, to the side, above it, or below it. Finally, although it is preferable for the touchscreen device to be mounted in front of and be of a size comparable to the monitor screen, deviations in size do not adversely affect operation. Stated differently, the touchscreen device could be either larger than or smaller than the monitor screen, and still be fully functional and useable with the computer. The arrangement thus more closely approximates a "universal" add-on accessory than is the case with conventional touchscreen devices which must directly overlie the monitor screen, and be of the same physical dimensions in X and Y directions.

Resolution problems involving the cursor being inadvertently hidden beneath the pointer, or beneath the user's finger are completely avoided, as a consequence of the mode of operation, involving the randomly-selectable reference point as described above.

The present arrangement, not requiring software support, does not tie up computer storage in the least. Full memory capacity is retained, for possible use with other programming options.

No connections are made to either the serial input/output port, or to expansion slots of the computer. Thus, the computer cabinet need not be opened, and there is no liability of damage to such slots, or to possible voiding of a warranty due to prohibitions or restrictions against opening the computer console. All existing slots remain available for other uses, as desired.

Compatibility problems between computer hardware and computer software are not affected by the installation and use of the simulator of the invention, since the simulator simply emulates a conventional mouse, and accomplishes this through the dedicated mouse port of the computer.

Finally, the arrangement described has the capability of duplicating mouse switch functions through the touchscreen itself, by virtue of the hardware and firmware of the interface circuit automatically reserving up to three "switch" zones at the bottom of the screen. Touching of any one of these zones is detected in the program, and an emulation of a mouse switch closure is sent to the dedicated mouse port through the cable 150 that connects with the output of the mouse driver 132, FIGS. 2 and 6.

Figure 12:
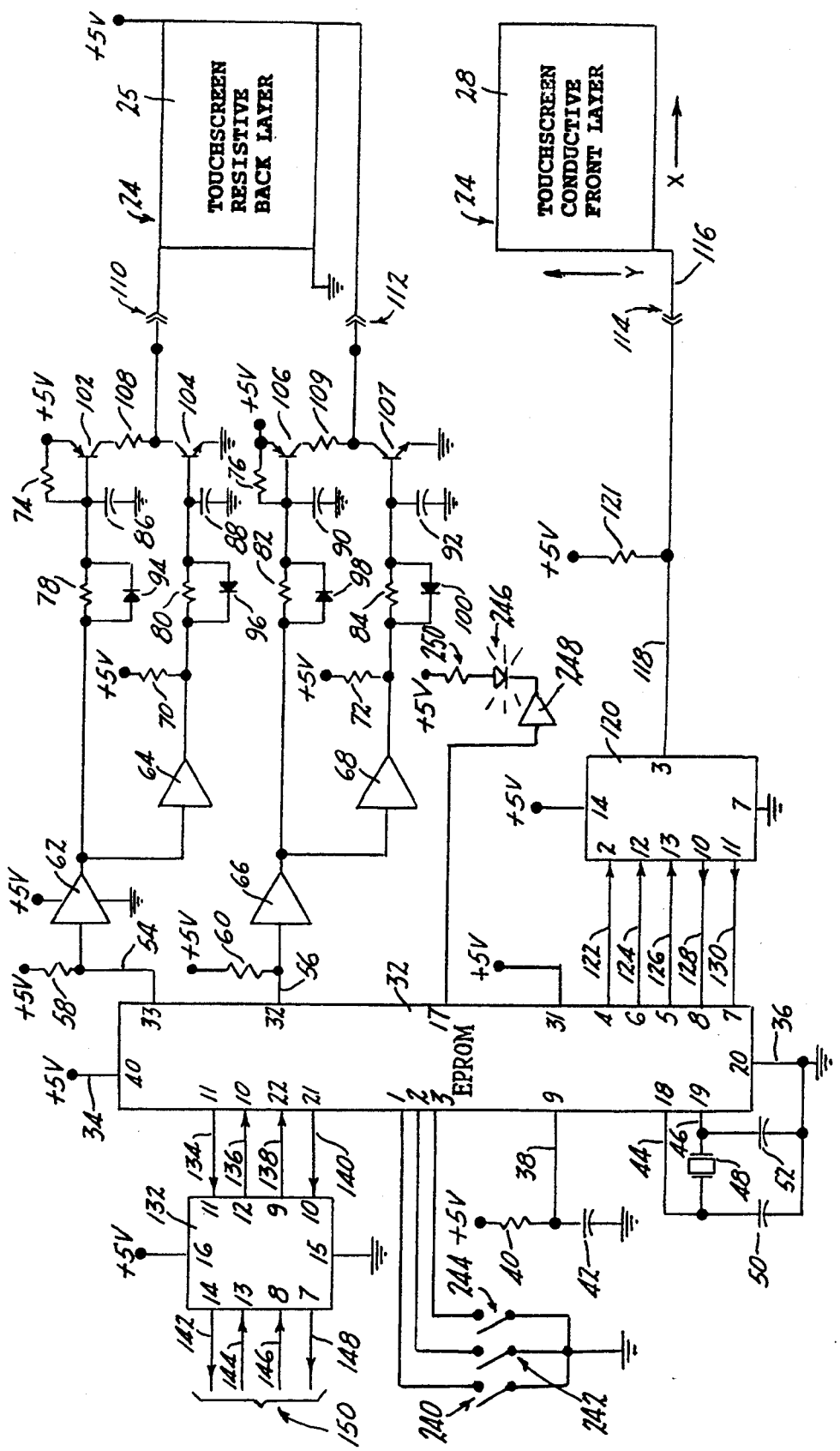
FIG. 12 is a schematic circuit diagram similar to FIG. 2, of the said other embodiment of the invention, the electronic interface thereof incorporating firmware represented by the Hex file set forth in Appendix C of this specification.

Another embodiment of the invention is illustrated in FIGS. 11 and 12. FIG. 11 is an Algorithm or flow chart similar to that of FIG. 7, and which details the steps and/or mode of operation of this other embodiment, and FIG. 12 is a schematic circuit diagram similar to FIG. 2, showing details of a novel and improved touchscreen interface constructed in accordance with the principles of the invention.

Essentially the touchscreen interface is a device which enables a direct absolute positioning of a cursor on a computer screen via a touchscreen device, the interface incorporating hardware and firmware and having an output protocol which is completely compatible with conventional mouse protocol, thereby enabling the interface to be connected directly to the dedicated mouse port connector receptacle of the computer with which the interface and touchscreen device are used.

More importantly, absolutely no adaptive software is required to be loaded into the computer. No internal connections to the computer are involved. All access is through the single dedicated mouse port, via a combination of hardware/firmware of the interface itself.

The interface firmware is represented by the Hex File shown in Appendix C of the present specification.

By the present invention, the interface firmware includes information relating to the display characteristics of the computer monitor with which the touchscreen device is used, namely the viewing area width and height, the number of display pixels per row and the number of rows (i.e. 640×480; 800×600; 1024×768, etc.). This permits a one-to-one mapping of a location on the touchscreen device, defined by X-axis and Y-axis voltages that correspond to a physical pixel location on the computer screen. Also, by the invention there are means to initialize or calibrate the interface memory with any particular current position of the cursor, even a random position thereof. Calibration is undertaken at the time that power is initially applied to the computer and touchscreen device, and optionally thereafter, specifically at any time that the operator chooses to undertake a new calibration routine.

Generally, with calibration routines following the initial calibration required at power-up, any time that the operator subsequently "touches" the touchscreen device at any point thereon for more than a predetermined time interval, typically 5 seconds, the interface calls for a fresh, or new calibration routine to be performed by the user. In carrying out the calibration, after the 5 second or longer "touch", the very next time that the operator "touches" the touchscreen device, the "touch" should be directly over the location of the cursor on the computer screen. This "contact" on the touchscreen device in effect reads to the interface, the location of the cursor, enabling the interface to apply this memorized information in calculating subsequent passes of the pointing device and converting them to data to be fed to the computer's dedicated mouse port, such data characterizing the locations of the said subsequent passes, and in each instance, automatically moving the computer cursor to a location substantially underlying the location of the pointing device. In carrying out such calculations, the interface determines the amount of X-axis and the amount of Y-axis pixel movement that would be required to move the cursor to the selected point, and then transmits the corresponding data, in mouse port compatible protocol, to the dedicated mouse port of the computer, resulting the movement of the cursor to a position underlying the pointing device. In a preferred embodiment, the simulation of a mouse switch activation, implementing a task corresponding to an icon designated by the cursor, is purposely delayed until the pointing device has been physically removed from the touchscreen device.

The arrangement is such that from the viewpoint of the operator, it appears to him that pressing a selected point on the touchscreen device and thereafter releasing the point, causes the computer to initiate an immediate action associated with that point, be it a target, icon, or other functional zone. Absolute touchscreen emulation is thus realized, but through a relative-type operational movement, all accomplished through data fed to the dedicated mouse port connector receptacle of the computer, and without reliance on supporting software/hardware associated with the computer per se.

The touchscreen device 24 employed is the same as that illustrated and described in connection with the embodiment of FIGS. 1–5, 7 and 9.

The host computer 10 having the dedicated mouse port connector receptacle 154 (FIG. 9) is the same as that illustrated and described in connection with the embodiment of FIGS. 1–5, 7 and 9.

In particular, this second embodiment of the present invention is illustrated in the schematic diagram of FIG. 12, the Algorithm of FIG. 11, and the Hex File of Appendix C. By a unique combination of firmware and hardware in the interface comprising the microprocessor or microcomputer 32 as will be described below, movements of a pointing device such as a user's finger 23 (FIG. 10), glove, wand or other pointing instrument, across a field of travel such as the surface of the touchscreen device 24, are converted to a digital format which substantially completely simulates or emulates that of a mouse, and thus such digital format is directly communicatable with the dedicated mouse port connector receptacle 154, FIG. 9, of the host computer 10, as mouse port compatible signals from the microcomputer 32. The signals direct the host computer to move the computer screen's cursor in accordance with and in direct correlation to the designated activity at the touchscreen device. More specifically, as in the first embodiment, the interface in effect converts the touchscreen device signals to standard mouse-protocol signals, and sends/receives such signals to/from the dedicated mouse port connector receptacle of the computer, without the need for modifications of any kind to the computer, be it software, hardware, firmware, or internal or external connections to expansion slots or serial ports thereof.

As an illustration of the various possible activities which can occur at the touchscreen device, an example of the operation of the second embodiment of the present invention will now be made, with reference to the Algorithm of FIG. 11.

Figure 10:
FIG. 10 is a plan view of a pointing device, such as the finger of a user. Other pointing devices, such as wands or styli, could be substituted, if desired.

In order to facilitate explanation, it will be assumed that the touchscreen device 24 is of the resistive overlay type, and which responds to the pressure or touch of the user's finger 23, FIG. 10. However, other types of touchscreen devices can be utilized with the present invention, and the use of the terms "touch", "touched", "depress", "depressed", etc. hereinbelow are intended to facilitate an understanding of the invention, and should not be considered as limiting the invention solely for use with touchscreens of this resistive overlay type.

The boxes in the Algorithm of FIG. 11 are labelled 210, 212, 214, 216, 218, 220 and 222, respectively, and the diamonds labelled 224, 226, 228, 230, 232 and 234, respectively. Diamonds represent inquiries, whereas boxes indicate actions or commands taken by the internal program (firmware represented by the Hex file of Appendix C) that has been installed in the microcomputer 32. The actions or commands are taken in response to a "YES" or "NO" answer to the particular inquiry set forth in the respective diamond.

Generally, box 210, diamond 226, box 212, diamond 228, and diamond 234 constitute the flow path of a calibration routine that is necessary to implement, prior to use of the absolute mode cursor control provided by the touchscreen device and interface of this second embodiment of the invention.

Referring to the Algorithm of FIG. 11, from the oval legend "START", if the power has just been applied to the system comprising the host computer 10, touchscreen device 24 and interface circuitry comprising microcomputer 32, then the branch 208 leading from the diamond 224 indicates a "YES" response, the branch 208 extending to the box 210. Box 210 indicates that an initial reading of the location of the X-axis and Y-axis coordinates is then taken, or stated differently, the X-voltage output and the Y-voltage output of the touchscreen device 24 are scanned by the converter 120, FIG. 12, and fed to the microcomputer 32 on lines 122, 124, 126, 128 and 130. The signals thus received in the microcomputer 32 are stored in a memory portion or memory unit thereof.

In order to calibrate the touchscreen device 24 and interface comprising microcomputer 32, the user is instructed to press on the exact location of the computer screen's cursor at the time just following power-on. Depression of the screen in this manner effects automatic calibration of the touchscreen device 24 and programmed microcomputer 32, to correspond with the (random) position of the cursor at the time of depression. Box 212 indicates that the memory in the microcomputer 32 is loaded with X-axis and Y-axis coordinates or data, corresponding to the initial position of the cursor as indicated by the person's finger touching the exact point occupied by the cursor. After the touchscreen device 24 has been released, a YES response from diamond 228 is seen, indicating that the calibration routine is completed, and branch 229 returns, via program path or line 237, to the oval marked "START" in the Algorithm.

With calibration of the touchscreen device and interface comprising microcomputer 32 completed, subsequent inquiries to diamond 224 result in a NO response from diamond 224, since power has already been applied and the calibration accomplished. Branch 225, corresponding to the NO response, extends to box 214. Box 214 indicates that the X-axis and the Y-axis voltages from the touchscreen device 24 are now scanned, and recorded. If the touchscreen device 24 is subsequently touched (i.e. pressed), diamond 230 will indicate a YES response. At this time, two events occur. One event relates to a "touch timer", which is described in the following paragraph. Referring to the other event, a calculation is made in the microcomputer 32, of the location of the point that has been "touched", and the difference (in both direction and displacement or distance) between this new "touch" location and the previously "touched" location determined, the previously "touched" location being that which was utilized in the calibration routine. The microcomputer 32 is fed with this new information, corresponding to the operations in the box 216, and the calculation of the change, effected, i.e. "CALCULATE X and Y DISTANCE TO NEW LOCATION". Box 218 indicates that the calculated result is fed to the microcomputer 32, and the new position of the cursor determined, and stored. Subsequently, in diamond 232, inquiry is made as to whether the touchscreen has been released, and in response to a YES, the "touch timer" is stopped. In diamond 234, inquiry is made as to whether or not the total length of time the touchscreen was touched exceeded a preselected calibration timing interval, in this example, chosen to be 5 seconds. If the response is NO, then, with reference to box 222, the new information corresponding to the new "touch" location is sent from the microcomputer 32 to the dedicated mouse port connector receptacle 154, resulting in movement of the cursor to the new location where the touchscreen device was last touched. Subsequent release of the touchscreen device simulates the activation ("click") of the left switch of a mouse, followed by a delay of typically 0.1 seconds, and followed in turn by a release of the left mouse switch. As a result the X-axis and Y-axis data corresponding to the new location which has been touched is, upon said simulated mouse switch release, implemented by the host computer 10 through its dedicated mouse port connector receptacle (FIG. 9, item 154). Line 237 designates a flow path, or functional return of the program to the oval marked START, ready for subsequent touches applied to the touchscreen device 24.

As can be readily understood, for diamonds 226, 228, 230 and 232, NO responses merely cause the program to dwell at these locations, in the manner of a functional loop; no action occurs until YES responses are detected, and corresponding actions implemented.

The event referred to in the previous paragraph, involving the "touch timer", will now be discussed. Referring again to box 216, the "touch timer" (located in the microcomputer 32 and implemented through firmware installed therein) functions to discriminate between "touches" on the touchscreen device that persist for a time interval that is less than the calibrating touch time interval noted above, namely 5 seconds, and those which persist for a time interval that is greater than 5 seconds, which latter would result in re-calibration being instituted. The "touch timer" is started as the program flow progresses through box 216, and is stopped as the program reaches box 220. If the touchscreen device 24 is depressed and held for more than 5 seconds, the response to the inquiry of diamond 234 is YES, and line 235 will direct the program flow back to branch 208 at diamond 224, and the calibration routine through box 210, diamond 226, box 212 and diamond 228 will need to be re-run.

Stated differently, with the touchscreen and interface calibrated, subsequent "touches" are treated as updates from the original calibration point only if the "touches" last less than 5 seconds. Any "touch" which is greater than 5 seconds is treated as a request to re-calibrate the touchscreen device and microcomputer 32, with the calibration routine beginning with box 210 and ending with branch 229 from diamond 228. The microcomputer thus discriminates between "touches" which are less than 5 seconds, constituting updates of movement of the pointing device, and "touches" which are greater than 5 seconds, which latter constitute conscious requests by the user to re-calibrate the microcomputer 32 and touchscreen device 24, as is also required immediately following power-up.

FIG. 12 shows a schematic diagram of the second embodiment of the invention. This diagram is almost identical to that of FIG. 2, with analogous operation of the similarly labelled components. In addition, three switches 240, 242 and 244 are included, connected to the microcomputer 32 as shown. These switches are external, manually-operable switches that function identically to those of a mouse having three switches, namely a left switch 240, a middle switch 242, and a right switch 244. The inclusion of the switches enables normal mouse-switch operation to be effected, even with the touchscreen device and interface connected as shown by the cable 150, FIG. 6, to the dedicated mouse port connector receptacle 154, FIG. 9.

In addition, an optional LED 246 is provided, driven by a suitable TTL driver 248, and including load resistor 250, connected as shown. The LED 246 provides, through the firmware represented by the Hex file of Appendix C which has been loaded in the microcomputer 32, an indication of the status of the calibration of the touchscreen device and interface comprising microcomputer 32.

With the connections as indicated, the LED 246 will become illuminated when the power is initially applied, or when the touchscreen is pressed for more than the calibration time interval, namely 5 seconds. If the LED 246 is illuminated, the touchscreen and interface are not calibrated. In effect, the illumination of the LED is a call to the user, to institute calibration, namely by touching the screen at the exact location over the existing position of the cursor, being certain not to hold the "touch" more than only momentarily, at most not approaching 5 seconds, and thereafter removing the "touch", at which time the calibration will be completed and the LED 246 will be extinguished.

Subsequently, if the screen is touched and held for more than 5 seconds, the LED will become illuminated again, indicating a call to the user to initiate re-calibration. Touching the touchscreen at the exact location of the cursor, and holding it for less than 5 seconds, will complete the calibration, causing the LED 246 to be extinguished.

As an alternative (not shown), the initiation of decision to calibrate can be made through an external switch (not shown), or even through one of the unused mouse-simulation switches (i.e. switch 242 or 244).

The invention also embodies a novel and improved method of controlling the movement of a cursor by means of a touchscreen device, as set forth below: In an interface circuit 120, 32, for connection between a touchscreen device 24 and a computer 10 having a screen 12 and a cursor moveable across the screen, said computer 10 further having a dedicated mouse port receptacle 154, FIG. 9, the method of implementing an absolute positioning of the cursor on the computer screen by means of a pointing device associated with the touchscreen device, the method comprising the steps of calibrating an initial position of the cursor on the computer screen 12, to correlate the initial position to X-axis and Y-axis based data from the touchscreen device 24, retrieving the X-axis and Y-axis based data from the touchscreen device, and storing the retrieved data in a memory of the interface circuit. The method further embraces the steps of applying the pointing device to a random point on the touchscreen device, so as to cause the touchscreen device to produce new X-axis and Y-axis based data corresponding to the location of the random point. Thereafter, the method involves producing voltages corresponding to the difference in the data stored in the memory and the new data received from the application of the pointing device to the random point on the touchscreen device, as to both direction and displacement of the pointing device with respect to the initial position of the cursor, and thereafter converting the difference voltages into mouse port compatible protocol signals and transmitting the mouse port compatible protocol signals to the dedicated mouse port receptacle of the computer, such that the cursor on the computer screen, following initial calibration, moves in succession, to different points that in each instance, substantially underlie the pointing device associated with the touchscreen device.

The arrangement is such that the cursor on the computer screen can be made to track, in an absolute mode instead of a relative mode, movements of a pointing device applied to the touchscreen device, following an initial calibration routine. Calibration of the touchscreen and interface (microcomputer 32) is effected following either an initial power-up condition, or alternately in response to pressing the touchscreen for a length of time exceeding a predetermined calibration timing interval, typically 5 seconds. Following a depression of over 5 seconds, the operator then removes the pointing device, and re-applies it directly over the location of the cursor, momentarily, then removes the pointing device. The calibration then is completed. Subsequent applications of the pointing device to the touchscreen device, of a length less than 5 seconds each, will initiate a simulated mouse-produced positioning of the cursor directly under the location of the pointing device, with a depression of the left switch 240 simulating a left mouse switch, and a subsequent release thereof, in turn causing data to be transmitted to the dedicated mouse port connector receptacle of the computer. Such data accurately represents movement of the computer cursor by a mouse; actuation of the left (mouse-mimicking) switch 240 to "click" onto an icon, target, or zone of the computer screen, thus initiates appropriate action from the computer corresponding to the specific function of the icon, target, etc.

By the invention there has thus been realized a unique capability, namely an absolute mode control of a cursor by means of a relative mode device in the form of a touchscreen device, and accompanying interface, the latter being connected solely to the dedicated mouse port connector receptacle of the host computer. This arrangement is believed to constitute a significant breakthrough in the field of touchscreens; absolutely no modification to the existing hardware/software of the host computer is required. Nor are additional electrical connections of any kind needed.

In the event of an operational problem, it is a simple matter to merely disconnect the cable from the interface to the mouse port connector receptacle, and substitute a conventional mouse. This operation will isolate any problem, and indicate the location as being either the host computer, or the touchscreen device/interface of the invention.

The devices and methods of the invention are thus seen to represent a distinct advance and improvement in the technology of mouse simulators and touchscreen devices.

Variations and modifications are possible without departing from the spirit of the invention.

Each and every one of the appended claims defines an aspect of the invention which is separate and distinct from all others, and accordingly it is intended that each claim be treated as such when examined in the light of the prior art devices in any determination of novelty or validity.

APPENDIX A

SOURCE CODE - ASSEMBLY LANGUAGE PROGRAM "JV5"
for implementing Algorithm of Fig. 7

```
;         CTI-18              TEST PIN P3.2
;         JV5      TOUCHSCREEN
;         R4=XCOUNT  R5=DLYRX
;         R2=YCOUNT  R3=DLYRY
;;;;
SWDLY     EQU      40
S1DLY     EQU      21
BAUD1     EQU      E8H
```

```
XMTDLY    EQU     10              ;R1 CLK
DLTADN    EQU     50              ;LOPAS
VLCTN     EQU     45              ;SW FROM DISLP. TO VEL.

CODE
          ORG     0
          AJMP    RST

ORG     0BH
VTR0:     CPL     P1.5            ;ADCLK
          MOV     TL0,#210        ;PT0=0
          JNB     P1.5,$+5
          SETB    RISNGF
          RETI

ORG     01BH
          AJMP    VTR1

ORG     23H
VSINT:    PUSH    A
          PUSH    PSW
          MOV     PSW,#0
SEND:     CLR     TI
          CLR     TR0             ;COUNT
          MOV     A,R0
          MOV     DPTR,#SERIAL
          JMP     @A+DPTR

VTR1:     PUSH    PSW             ;PT1=1
          MOV     PSW,#0
          JNB     VELCTF,T1L2
          DJNZ    R5,T1L1
          INC     R4
          MOV     R5,DLYRX
T1L1:     DJNZ    R3,T1L2
          INC     R2
          MOV     R3,DLYRX
T1L2:     DJNZ    R6,T1N          ;1.11 MS
          MOV     R6,#4
          INC     SWCLK
          INC     R1
          DJNZ    R7,T1N          ; 71 MS !!!
          MOV     R7,#64
          INC     S1CLK           ;LATCH
T1N:      POP     PSW
          RETI

;;;;
RST:      MOV     P1,#FFH
          MOV     P0,#FFH
          MOV     P2,#FFH
          MOV     P3,#FFH
          MOV     PSW,#0
          MOV     SP,#STACKP
          MOV     TH1,#BAUD1
          MOV     SCON,#40H
          MOV     TMOD,#23H
          MOV     TCON,#40H
```

```
        MOV     PCON,#0
        MOV     FLAGS,#0
        MOV     FLAGS1,#0
        MOV     FLAGS2,#0
        MOV     FLAGS3,#0
        MOV     STATUS,#0
        MOV     SWITCH,#0
        MOV     SWNEW,#0
        SETB    RS0
        CLR     RS1
        MOV     R1,#8
        MOV     R4,#0
        MOV     R5,#0
        MOV     R6,#0
        MOV     R7,#0
        SETB    RS1
        CLR     RS0
        MOV     R1,#8
        MOV     R4,#0
        MOV     R5,#0
        MOV     R6,#0
        MOV     R7,#0
        MOV     PSW,#0
        MOV     R0,#0
        MOV     R2,#0
        MOV     R4,#0
        MOV     R3,#255
        MOV     R5,#255
        MOV     R6,#04
        MOV     R7,#64
        MOV     IP,#0AH
        MOV     IE,#9AH

;;;;
START:  MOV     PSW,#0

GETX:   SETB    P0.7
        CLR     P0.6

;;;;    DELAY
        CALL    TSTSWS

MOV     A,#FFH
        DEC     A
        CJNE    A,#0,$-1
        DEC     A
        CJNE    A,#0,$-1
        DEC     A
        CJNE    A,#0,$-1
        DEC     A
        CJNE    A,#0,$-1

CALL    TSTSWS

CALL    COUNT
        CALL    LOPASX
        MOV     A,LCOUNT
        MOV     XADN,A
```

```
              JB        XMTF,$+6
              CALL      XMTST

GETY:         SETB      P0.6
              CLR       P0.7

;;;;          DELAY
              CALL      TSTSWS

MOV       A,#FFH
              DEC       A
              CJNE      A,#0,$-1
              DEC       A
              CJNE      A,#0,$-1
              DEC       A
              CJNE      A,#0,$-1
              DEC       A
              CJNE      A,#0,$-1

CALL      TSTSWS
              JB        XMTF,$+6
              CALL      XMTST
              CALL      COUNT
              CALL      LOPASY
              MOV       A,LCOUNT
              MOV       YADN,A

JB        XMTF,$+6
              CALL      XMTST

MAIN:         JB        TOUCHF,MLO
              MOV       A,XADN
              CJNE      A,#250,$+3
              JC        ML5
              AJMP      ML8
ML5:          MOV       A,YADN
              CJNE      A,#250,$+3
              JC        ML55
              AJMP      ML8
ML55:         SETB      TOUCHF
              CLR       VELCTF
              MOV       R2,#8     ;FLTR
              MOV       XADNLD,XADN
              MOV       YADNLD,YADN
              MOV       XADLD1,XADN
              MOV       YADLD1,YADN
              AJMP      MLN
MLO:          MOV       A,XADN
              CJNE      A,#250,$+3
              JNC       ML11
              MOV       A,YADN
              CJNE      A,#250,$+3
              JNC       ML11
              SJMP      ML1
ML11:         DJNZ      R2,$+6    ;ML8
              CLR       TOUCHF
              CLR       VELCTF
              AJMP      ML8
```

```
ML1:    MOV     A,YADN
        CJNE    A,#55,$+3
        JNC     ML2
        AJMP    ML8
ML2:    CLR     ES
        MOV     A,YADNLD
        CLR     C
        SUBB    A,YADN
        JNC     $+6
        SETB    SIGNY
        SJMP    $+4
        CLR     SIGNY
        JNB     SIGNY,$+6
        CPL     A
        ADD     A,#1
        ADD     A,R2
        XCH     A,R2        ;R2 = YCOUNT
        MOV     A,XADNLD
        CLR     C
        SUBB    A,XADN
        JNC     $+6
        SETB    SIGNX
        SJMP    $+4
        CLR     SIGNX
        JNB     SIGNX,$+6
        CPL     A
        ADD     A,#1
        ADD     A,R4
        SETB    ES
ML9:    JB      VELCTF,ML7
        MOV     A,XADLD1
        SUBB    A,XADNLD
        JNC     $+5
        CPL     A
        ADD     A,#1
        CJNE    A,#VLCTN,$+3
        JC      $+4
        SETB    VELCTF
        MOV     A,YADLD1
        SUBB    A,YADNLD
        JNC     $+5
        CPL     A
        ADD     A,#1
        CJNE    A,#VLCTN,$+3
        JC      $+4
        SETB    VELCTF
        MOV     XADNLD,XADN     ;REST ADNLD IF IN DISPL.
        MOV     YADNLD,YADN     ;OR FIRST TIME VELCTY !
ML8:    SJMP    MLN

ML7:    SETB    VELCTF
        MOV     A,YADNLD
        CLR     C
        SUBB    A,YADN
        JNC     $+6
        SETB    SIGNY
        SJMP    $+4
        CLR     SIGNY
```

```
        JNB     SIGNY,$+6
        CPL     A
        ADD     A,#1
        CALL    CURVE

MOV     DLYRG,R3
        CJNE    A,DLYRG,$+3
        JNC     $+3
        MOV     R3,A
        MOV     DLYRY,A

MOV     A,XADNLD
        CLR     C
        SUBB    A,XADN
        JNC     $+6
        SETB    SIGNX
        SJMP    $+4
        CLR     SIGNX
        JNB     SIGNX,$+6
        CPL     A
        ADD     A,#1
        CALL    CURVE

MOV     DLYRG,R5
        CJNE    A,DLYRG,$+3
        JNC     $+3
        MOV     R5,A
        MOV     DLYRX,A
        SJMP    MLN

MLE:    CLR     ES
        MOV     XCOUNT,#0
        MOV     YCOUNT,#0
MLN:    SETB    ES
        JB      XMTF,$+6
        CALL    XMTST

AJMP    START

;;;;
;COUNT;          P1.3 = /ADCS
;                P1.4 = ADIN START
;                P1.5 = ADCLK
;                P1.7 = ADOUT
;;;;
COUNT:  SETB    P1.3    ;ALWAYS IN PSW=0
        CLR     P1.5    ;ADCLK
        CLR     RISNGF
        CLR     P1.3    ;ADCS
        MOV     TL0,#220
        SETB    TR0
        SETB    P1.4    ;ADI START
        JNB     TR0,COUNT
        JNB     RISNGF,$-3
        CLR     RISNGF
        SETB    P1.4    ;SINGLE
        JNB     TR0,COUNT
        JNB     RISNGF,$-3
```

```
        CLR     RISNGF
        CLR     P1.4        ;ODD
        JNB     TRO,COUNT
        JNB     RISNGF,$-3
        CLR     RISNGF
        CLR     P1.4        ;SELECT B1
        JNB     TRO,COUNT
        JNB     RISNGF,$-3
        CLR     RISNGF
        SETB    P1.4        ;SELECT B0
        JNB     TRO,COUNT
        JNB     RISNGF,$-3
        CLR     RISNGF
        JNB     TRO,COUNT
        JNB     RISNGF,$-3
        CLR     RISNGF      ;XTRA   CLK
        JNB     TRO,COUNT
        JNB     RISNGF,$-3
        CLR     RISNGF
        JB      P1.7,$+7            ;ADOUT
        CLR     ADN.7
        SJMP    $+4
        SETB    ADN.7
        JNB     TRO,COUNT
        JNB     RISNGF,$-3
        CLR     RISNGF
        JB      P1.7,$+7
        CLR     ADN.6
        SJMP    $+4
        SETB    ADN.6
        JNB     TRO,COUNT
        JNB     RISNGF,$-3
        CLR     RISNGF
        JB      P1.7,$+7
        CLR     ADN.5
        SJMP    $+4
        SETB    ADN.5
        JNB     TRO,CNTL
        JNB     RISNGF,$-3
        CLR     RISNGF
        JB      P1.7,$+7
        CLR     ADN.4
        SJMP    $+4
        SETB    ADN.4
        JNB     TRO,CNTL
        JNB     RISNGF,$-3
        CLR     RISNGF
        JB      P1.7,$+7
        CLR     ADN.3
        SJMP    $+4
        SETB    ADN.3
        JNB     TRO,CNTL
        JNB     RISNGF,$-3
        CLR     RISNGF
        JB      P1.7,$+7
        CLR     ADN.2
        SJMP    $+4
        SETB    ADN.2
```

```
            JNB     TR0,CNTL
            JNB     RISNGF,$-3
            CLR     RISNGF
            JB      P1.7,$+7
            CLR     ADN.1
            SJMP    $+4
            SETB    ADN.1
            JNB     TR0,CNTL
            JNB     RISNGF,$-3
            CLR     RISNGF
            JB      P1.7,$+7
            CLR     ADN.0
            SJMP    $+4
            SETB    ADN.0
            CLR     TR0
            SETB    P1.3
CNTN:       RET
CNTL:       AJMP    COUNT

;;;;
CURVE:      CJNE    A,#87,$+3
            JC      CM1
            MOV     A,#87       ;MAX
CM1:        CLR     ES
            MOV     DPTR,#TABLE
            MOVC    A,@A+DPTR
            SETB    ES
CMN:        RET

TABLE:      DB      224
            DB      224
            DB      199
            DB      179
            DB      163
            DB      150
            DB      138
            DB      129
            DB      120
            DB      112
            DB      106
            DB      100
            DB      95
            DB      90
            DB      86
            DB      82
            DB      78
            DB      75
            DB      72
            DB      69
            DB      67
            DB      65
            DB      63
            DB      60
            DB      58
            DB      56
            DB      54
            DB      52
            DB      51
```

```
DB    50
DB    49
DB    48
DB    47
DB    46
DB    45
DB    44
DB    43
DB    42
DB    40
DB    39
DB    38
DB    37
DB    37
DB    36
DB    36
DB    35
DB    35
DB    34
DB    34
DB    33
DB    33
DB    32
DB    31
DB    31
DB    30
DB    30
DB    29
DB    29
DB    28
DB    28
DB    28
DB    27
DB    27
DB    27
DB    26
DB    26
DB    26
DB    25
DB    25
DB    25
DB    24
DB    24
DB    24
DB    23
DB    23
DB    23
DB    22
DB    22
DB    22
DB    21
DB    21
DB    21
DB    20
DB    20
DB    20
DB    20
DB    20
```

```
            DB      20
            DB      20
            DB      20
            DB      20
            DB      20
            DB      20
            DB      20
            DB      20
            DB      20
            DB      20
            DB      20
            DB      20
            DB      20

;;;;
LOPAEX: SETB    RS0
        CLR     RS1
LPXX:   MOV     A,ADN
        CJNE    A,#250,$+3
        JNC     LPXA        ;;;;;; TOUCHS
LPX1:   CLR     C
;       SUBB    A,R6        ;R6=OLD
;       JNC     $+5
;       CPL     A
;       ADD     A,#1
;       CJNE    A,#DLTADN,$+3
        MOV     A,R6
        CJNE    A,#250,$+3
        JC      LPX0
LPXA:   MOV     R6,ADN
        MOV     R7,#0
        SJMP    LPX3
LPX0:   MOV     A,ADN
        ADD     A,R4
        XCH     A,R4
        XCH     A,R5
        ADDC    A,#0
        XCH     A,R5
        DJNZ    R1,LPX2
        XCH     A,R4
        RR      A
        RR      A
        RR      A
        ANL     A,#1FH
        XCH     A,R4
        MOV     A,R5
        SWAP    A
        ANL     A,#70H
        RL      A
        ADD     A,R4
        MOV     R6,A        ;SAVE
        MOV     R7,#0
LPX3:   MOV     R1,#8
        MOV     R4,#0
        MOV     R5,#0
LPX2:   MOV     LCOUNT,R6
LPXN:   MOV     PSW,#0
        RET
```

```
LOPASY: SETB    RS1
        CLR     RS0
        MOV     A,ADN
        CJNE    A,#56,$+3          ;;TOUCH
        JC      LPXA               ;;SWS
        AJMP    LPXX

;;;;
;TSTSWS: A IS NOT RESTORED,  SETS SWF AND
;        DEBOUNCES SWS (20 MS).
;;;;
TSTSWS: MOV     A,YADNLD
        CJNE    A,#56,$+3
        JC      J9
        MOV     A,#0
        SJMP    J0
J9:     MOV     A,#04       ;L.SW
        SJMP    J0

;;;;;;;;;;
        CJNE    A,#165,$+3
        JNC     $+6
        MOV     A,#02       ;M.SW
        SJMP    J0
        MOV     A,#01       ;R.SW
J0:     CJNE    A,SWITCH,J1
        MOV     SWNEW,A
        CLR     F1
        SJMP    SWN
J1:     JNB     F1,J2
        CJNE    A,SWNEW,J2
        SJMP    J3
J2:     MOV     SWNEW,A
        MOV     SWCLK,#0
        SETB    F1
J3:     MOV     A,#SWDLY
        CJNE    A,SWCLK,$+3
        JNC     SWN
        CLR     F1
        MOV     SWITCH,SWNEW
        SETB    SWF
SWN:    NOP

LATCH:  MOV     A,SWITCH
        JNB     ACC.2,LCH1
        JB      S1OFF,LCH2
        JB      LEDF,LCHN
        JB      STMRF,LCH3
        SETB    STMRF
        MOV     S1CLK,#0
        SJMP    LCHN
LCH3:   MOV     A,S1CLK
        CJNE    A,#S1DLY,$+3
        JC      LCHN
        SETB    LEDF
        CLR     S1OFF
        CLR     STMRF
        SJMP    LCHN
```

```
LCH1:   JNB     LEDF,LCH2
        SETB    S1OFF
        SJMP    LCHN
LCH2:   CLR     LEDF
        CLR     S1OFF
        CLR     STMRF
LCHN:   RET

;;;;
XMTST:  JNB     XMTF,$+4
        RET
        JNB     XMTDLF,XMTL1
        CJNE    R1,#XMTDLY,$+3
        JNC     XMTL1
        RET
XMTL1:  CLR     XMTDLF
        JB      SWF,SERIAL
        MOV     A,R4
        JNZ     SERIAL
        MOV     A,R2
        JNZ     SERIAL
        JNB     P3.2,SERIAL     ;°TEST PIN
        RET

SERIAL: MOV     A,SWITCH
        JNB     LEDF,$+5
        SETB    ACC.2           ;SW LATCH
        SETB    ACC.7
        MOV     SBUF,A
        MOV     R0,#(SERX-SERIAL)
        RET

SERX:   MOV     A,R4
        MOV     R4,#0
        JZ      $+8
        JNB     SIGNX,$+6
        CPL     A
        ADD     A,#1
        MOV     SBUF,A
        MOV     R0,#(SERY-SERIAL)
        POP     PSW
        POP     A
        RETI

SERY:   MOV     A,R2
        MOV     R2,#0
        JZ      $+8
        JNB     SIGNY,$+6
        CPL     A
        ADD     A,#1
        MOV     SBUF,A
        MOV     R0,#(SERX1-SERIAL)
        POP     PSW
        POP     A
        RETI

SERX1:  MOV     A,R4
        MOV     R4,#0
```

```
        JZ      $+8
        JNB     SIGNX,$+6
        CPL     A
        ADD     A,#1
        MOV     SBUF,A
        MOV     R0,#(SERY1-SERIAL)
        POP     PSW
        POP     A
        RETI

SERY1:  MOV     A,R2
        MOV     R2,#0
        JZ      $+8
        JNB     SIGNY,$+6
        CPL     A
        ADD     A,#1
        MOV     SBUF,A
        MOV     R0,#(SERFIN-SERIAL)
        POP     PSW
        POP     A
        RETI

SERFIN: CLR     XMTF
        MOV     R1,#0
        SETB    XMTDLF
        MOV     R0,#0
        POP     PSW
        POP     A
        RETI

DATA
        ORG     20H
FLAGS   DB
FLAGS1  DB
FLAGS2  DB
FLAGS3  DB
ADN     DB
        ORG     2FH
STATUS  DB

;;;;        FLAGS
LEDF    REG     20H.0
VELCTF  REG     20H.1
XMTDLF  REG     20H.3
SIGNX   REG     20H.4
SIGNY   REG     20H.5
;;;;        FLAGS1
XMTF    REG     21H.0
SWF     REG     21H.1
TOUCHF  REG     21H.4
RSTF    REG     21H.5
;;;;        FLAGS2
TOGLF   REG     22H.0
F1      REG     22H.1
ADSINF  REG     22H.3
ADRSTF  REG     22H.4
```

```
MUXF      REG      22H.5
RISNGF    REG      22H.6
ZEROF     REG      22H.7
;;;;               STATUS
SIOFF     REG      2FH.1
STMRF     REG      2FH.2
          ORG      30H
SECCLK    DB
SLOCLK    DB
SWCLK     DB
SICLK     DB
SWITCH    DB
SWNEW     DB
LCOUNT    DB
XCOUNT    DB
YCOUNT    DB
TMPR1     DB
XADN      DB
YADN      DB
XADNLD    DB
YADNLD    DB
XADLD1    DB
YADLD1    DB
DLYRX     DB
DLYRY     DB
DLYRG     DB
STACKP    DB

END
```

APPENDIX B

HEX FILE "JV.5HEX"
Derived from Source Code appearing in Appendix A,
and identifying specific data bytes
and addresses entered into Microprocessor 32

```
:020000000155A8
:0B000B00B295758AD2309502D21632F1
:02001B000133AF
:100023000C0E0C0D075D000C299C28CE890043C7384
:100033000C0D075D00030010ADD030CAD40DB030AEC
:100043000AB40DE0B7E04053209DF047F400533D06D
:100053000D0327590FF7580FF75A0FF75B0FF75D026
:10006300007581437580E87598407589237588400BF
:1000730075807075200075210075220075230075B2
:100083002F00753400753500D2D3C2D479087C00B3
:100093007D007E007F00D2D4C2D379087C007D002E
:1000A3007E007F0075D00078007A007C007BFF7DA6
:1000B300FF7E047F4075B80A75A89A75D000D28771 71
:1000C300C2861203AD74FF14B400FC14B400FC1414
:1000D300B400FC14B400FC1203AD12021812036244
:1000E300E536F53A200803120420D286C2871203AC
:1000F300AD74FF14B400FC14B400FC14B400FC147D
:10010300B400FC1203AD2008031204201202181 2DB
```

:10011300003A0E536F53B2008031204202000C26E556
:100123003AB4FA00040024106E53BB4FA0040024110A
:1001330006D20CC2017A08853A3C853B3D853A3E9E
:10014300853B3F410EE53AB4FA005009E53BB4FA6A
:100153000050028008DA04C20CC2014106E53BB438
:1001630037005002410 6C2ACE53DC3953B5004D273
:100173005B002C205300503F424012ACAE53CC305
:10018300953A5004D2048002C204300403F42401DB
:100193002CCCD2AC200128E53E953C5003F424013D
:1001A300B42D004002D201E53F953D5003F42401F4
:1001B300B42D004002D201853A3C853B3D804CD2B0
:1001C30001E53DC3953B5004D2058002C2053005CD
:1001D3003F424011202EE8B42B542005001FBF5F9
:1001E30041E53CC3953A5004D2048002C204300472
:1001F3003F424011202EE8D42B542005001FDF5D5
:100203004080 08C2AC753700753800D2AC200803B3
:10021300120420 01BED293C295C216C293758ADC22
:10022300D28CD294308CEE3016FAC216D294308C23
:100233 00E43016FAC216C294308CDA3016FAC216BB
:100243000C294308CD03016FAC216D294308CC63099
:1002530016FAC216308CBE3016FAC216308CB6307F
:1002630016FAC216209704C2278002D227308CA523
:100273003016FAC216209704C2268002D226308C8A
:1002830094 3016FAC216209704C2258002D2253074
:100293008C573016FAC216209704C2248002D22447
:1002A300308C463016FAC216209704C2238002D23D
:1002B3002330 8C353016FAC216209704C2228002EE
:1002C300D222308C243016FAC216209704C2218 021
:1002D30002D2213 08C133016FAC216209704C220A2
:1002F3008002D220C28CD2932241 18B4570040021C
:1002F3007457C2AC9002FE93D2AC22E0E0C7B3A322
:100303000968A8178706A645F5A56524E4B4B4543C9
:0103130041A8

:100314003F3C3A383634333231302F2E2D2C2B2AB1
:100324002827262525242423232222212 1201F1F98
:100334001E1E1D1D1C1C1B1B1A1A1A19191905
:10034400181818171717161616151515141414144B
:100354001414141414141414141414 141414D2D3DC
:100364000C2D4E524B4FA005007C3EEB4FA00400640
:10037400AE247F00801AE5242CCCCD3400CDD916D0
:100384 00CC030303541FCCEDC45470232CFE7F0014
:100394 0079087C007D008E3675D00022D2D4C2D379
:1003A400E524B4380040C96166E53DB43800400432
:1003B40 07400800F7404800BB4A500500474028090
:1003C4000 27401B53406F535C211801D301105B52E
:1003D40035028007F535753200D2117428B5320024
:1003E4005007C211853534D20900E53430E21F20AC
:1003F4007923200026207A07D27A753300801CE501
:1004040033B415004015D200C279C27A800D300091
:100414004D2798006C200C279C27A22300801224D
:10042400300306B90A00500122C20320090AEC7005
:100434 007EA700430B20122E534300002D2E2D27D
:10044400E7F599780E22EC7C006006300403F4246E
:1004540001F5997822D0D0D0E032EA7A00600630F3
:100464000503F42401F5997836D0D0D0E032EC7C41
:10047400060063 00403F42401F599784AD0D0D002
:10048400E032EA7A006006300503F42401F5997835
:100494005ED0D0D0E032C2087900D2037800D0D048

:1004A400D0E03227434F50595249474854204354CF
:1004B4004920454C454354524F4E4943532031390A
:1004C4003839204C4C42052494748545320524516
:0704D400534552645442731
:0504FB000000000000FC
:01050A0000F0
:10050B0000000000000000000000000000000000E0
:04051B0000000000DC
:00000001FF

APPENDIX C

HEX FILE identifying specific data bytes and addresses entered into Mircoprocessor 32, for embodiment of Figs. 11 and 12.

:0200000001728B
:0B000B00B295758AD2309502D21432F3
:02001B000141A1
:10002300C299C29832300803D22F22C2AC7599CD3F
:10003300C2993099FDC299C20BC22FD22E22C0D0D4
:1000430075D00030A10A30A10730A104C22E800B65
:100053002OA10820A105202E02112BDE0F7E040511
:100063003C09DF087F40053D053B0547D0D032758D
:100073009OFF75A0FF75B0FF75B0FF75D000758187
:10008300487589237588407587007508E875984094
:1000930075200075210075220075230075250075F4
:1000A3002700752F00754100752600753260753382
:1000B300607538607539600D2D3C2D479087C007D0D
:1000C300007E00D2D4C2D379087C007D007E007507
:1000D300D00078007A007C007E047F40D21BC2B33C
:1000E3002OB202D211C2A420A502D212C2A220A31E
:1000F3002D21375A0FF75B0FF75B80075A88A7595
:10010300D000200008301B04C2858002D2858009F9
:10011300E53BB414004002C285C280D281D287D2AB
:10012300B6753F05C280D281D21DC21C202833064
:1001330011091203A5300903120500D53FE6753FE7
:10014300090C21A120283120363301A05C21A753FD9
:100153009D53FEFE542B41F0050047400800294B8
:100163001EF536D280C281D283C282753F05D28307
:10017300C282C21D120283301091203A530090382
:1001830012050OD53FE8753F09C21A120283120314
:100193009F301A05C21A753F09D53FEFE542B41FD8
:1001A30005004740080029A1EF537C283D282C2C9
:1001B30080D281002004412018620003BE5367083
:1001C300024140E5377002414C8538F0120259B4B4
:1001D3000020050758539F012026EB40200506AD5E0
:1001E3004072D2008536388537397538001203E1FA
:1001F30012045112040CA805CE5367058E537705416
:10020300100451C200E53BB414004006D218D204D3
:1002130041572011031205104157E536603E53777
:100223006032853890120259B402005018538F04F
:10023300120260EB40200501D5401985363285374B

```
:10024300330204C21BC200B00B853638853739C2CE
:100253000075400321O2E5F0B5360040069536D21D
:100263000180O7C3C201E53695F022E5F0B53700FA
:1002730040069537D2028007C3C202E53795F022C4
:1002830000D293C295C214C293C2ABC2AC758AD2D8
:10029300C28DD2A9D28CD294003014FCC214D29451
:1002A300003014FCC214201C04C2948002D294D2E5
:1002B300AB00C2AB003014FCC214201D04C29480F6
:1002C30002D294003014FCC214D294003014FCC245
:1002D30014003014FCC214003014FCC21420970420
:1002E300C2278002D227D2AB00C2AB003014FCC2BB
:1002F30014209704C2268002D226003014FCC214B4
:100303009704C2258002D2250D3014FCC2142099
:02031300970440
:10031500C2248002D224D2AB00C2AB003014FCC28E
:1003250014209704C2238002D223003014FCC21487
:100335009704C2228002D222003014FCC214206D
:100345009704C2218002D221003014FCC2142097EB
:1003550004C2208002D220C28CD293D2AB22D2D347
:10036500C2D4E524C39E5003F42401B40200400620
:10037500AE24D21A8018E5242CFCED3400FDD914E6
:10038500EC030303541FFCEDC45470232CFE790BC1
:100395007C007D008E4275D00022D2D4C2D3616725
:1003A500E5B0C4F4540F03B52606F541C20DB02708
:1003B500300D05B541C26007F541753C00D20D743D
:1003C50014B53C005011C20D20370D85412630373C
:1003D50004D21B8002D20922854126228532F0856E
:1003E500383651597534037535530130675340440F
:1003F50075352AF5438534F0A4FCADF0E5438535274
:10040500F0C207A430D202D20720010320050D3027
:100415000050A2530F530502405F08020C39530F5C8
:100425003050019F404F530300704158F080F0EBC0087
:1004350002B0031C8006BD00031D7CFF00EC25F037
:10044500FCED34005403FDA20192052285A33F085AD
:100455003937516E7534027535803012067534020A
:100465007535143013067534037535207F5438534199
:10047500F0A4FAABF0E5438535F0C207A430D2020B
:10048500D20720020320060D3006D0A2531F531502A
:1004950002405F08020C39531F5315019F404F53168
:1004A500300704158F080FEBA00002B0031AB006BBDF
:1004B500000031B7AFFF00EA25F0FAEB34005403FB36
:1004C5000A202920622D208D20BD20A1205641205A4
:1004D50072120580E54412055A202F1CE5451205C8
:1004E5005A202F14E54612055A202F0C200BDC202C
:1004F5000AD985383285393C3C20822E526D20870F3
:1005050004C209A1403030020D2E4303202D2E5D231
:10051500E6D2E7C209A120D20874E012055A202FBD
:10052500D77480120505A202FCF74801205A202FB8
:1005350C730110281FD7900B964FD74C012055AF6
:10054500202FB5748012055A202FAD7480120555ADC
:10055500202FA581FDC299F5993099FDC29922BC3C
:1005650000OABD004C20B80037CFF1D22BA000AED
:10057500B0004C20A80037AFF1B22ECB421004081
:100585008C39420FC742080027C0060062001303CF
:10059500F42401335004D22980020C229335004D2F5
:1005A500288002C2280303543FD2E7F545EAB42167
:1005B50004008C39420FA7420800027A0060062067
```

```
:1005C5000203F42401335004D22B8002C22B335092
:1005D5004D22A8002C22A0303543FD2E7F546E536
:1005E50025D2E6D2E7F5447547002200075A80075C7
:1005F500A800740074007400C0E0C0E03227434FC7
:10060500505952494748542050 2E4A2E4D494B4186
:0C0615004E20313938392C31393 9332767
:100621002720414C4C20524947485453205 24553AE
:060631004552564544 42726
:0B0FF0000075A8007400C0E0C0E032F3
:08101B00000000000000000000CD
:01102A0000C5
:10102B000000000000000000000000000000000000B5
:09103B000000000000000000AC
:00000001FF
```

What is claimed is:

1. An interface circuit for connection between a touchscreen device and a computer having a screen and a cursor moveable across the screen, said computer further having an exteriorly accessible dedicated mouse port receptacle, said interface circuit comprising in combination:
  a) means disposed entirely exteriorly of the computer, for connection to the output of the touchscreen device, to accept data therefrom corresponding to X-axis and Y-axis positions of a pointing device associated with the touchscreen device,
  b) manually-initiated calibrating means disposed entirely exteriorly of the computer, for correlating the initial position of the cursor of the computer screen, to X-axis and Y-axis based data received from the touchscreen device,
  c) a memory unit disposed entirely exteriorly of said computer, and means for storing in said memory unit, said X-axis and said Y-axis based data received from the touchscreen device,
  d) means disposed entirely exterior of the computer, for discriminating between data received from said manually-initiated calibrating means, and data that is subsequently received from said touchscreen device and which has resulted from movement of the pointing device to a new position, and for producing voltages corresponding to the difference in said data as to both direction and displacement of the pointing device, measured from said initial position of the cursor,
  e) means connected with the memory unit and disposed entirely exteriorly of said computer, for converting said difference voltages, into mouse port compatible protocol signals, and
  f) means disposed entirely exteriorly of the computer, for transmitting said mouse port compatible protocol signals to the said exteriorly accessible dedicated mouse port receptacle of the computer, such that the cursor on the computer screen, following initial calibration, subsequently moves so as to substantially underlie the said new position of the pointing device associated with the touchscreen device.

2. The invention as set forth in claim 1, wherein:
  a) said manually-initiated calibrating means comprises means responsive to application of the pointing device to the touchscreen device for a length of time greater than a predetermined calibrating interval of time.

3. The invention as set forth in claim 1, wherein:
  a) said means for transmitting said mouse port compatible protocol signals comprises means responsive to removal of the pointing device from the touchscreen device after movement of the pointing device ceases.

4. The invention as set forth in claim 1, wherein:
  a) said touchscreen device is of the pressure-operated type, and wherein said manually-initiated calibrating means comprises means responsive to applying a pressing force on said touchscreen device for a length of time greater than a predetermined calibrating interval of time.

5. The invention as set forth in claim 1, wherein:
  a) said touchscreen device is of the pressure-operated type, and wherein said means for transmitting said mouse port compatible protocol signals comprises means responsive to removal of a pressing force from said touchscreen device.

6. The invention as set forth in claim 1, wherein:
  a) said manually-initiated calibrating means comprises a pointing device-responsive timer, and wherein application of said pointing device to the touchscreen device for a length of time greater than a predetermined calibrating time interval results in storage of X-axis and Y-axis data received from the touchscreen device, in the memory of the interface circuit.

7. The invention as set forth in claim 6, wherein:
  a) said means for producing voltages is rendered operative after said calibrating time interval has elapsed.

8. The invention as set forth in claim 7, wherein:
  a) said means for producing voltages responds to each successive change in the position of the pointing device over the touchscreen device, resulting in updating of the position of the cursor to a point under the pointing device after the latter has halted.

9. The invention as set forth in claim 6, wherein:
  a) said timer is rendered operative the first time that the pointing device is moved over the touchscreen device, said timer being halted when the pointing device is subsequently removed from the touchscreen device.

10. The invention as set forth in claim 1, wherein:
  a) said manually-initiated calibrating means comprises firmware constituting permanently stored information describing the size of the display area of the computer screen.

11. The invention as set forth in claim 10, wherein:
a) said difference voltages are calculated from information represented by said firmware and from information received from said memory unit corresponding to the X-axis based and Y-axis based data received from the touchscreen device.

12. The invention as set forth in claim 1, wherein:
a) said means for transmitting said mouse port compatible protocol signals includes means providing a mouse-switch closure signal, followed by a finite time delay, followed by a mouse-switch open signal, simulating manual operation of a mouse switch by a user's finger.

13. The invention as set forth in claim 1, wherein:
a) said transmitting means comprises means in the touchscreen device and in said memory unit, responsive to removal of the pointing device from the touchscreen device, for emulating a mouse switch activation.

14. The invention as set forth in claim 13, wherein:
a) said touchscreen device is of the pressure-operated type, responsive to touch,
b) said transmitting means comprises means in the touchscreen device and in said memory unit, responsive to release of said touch from the touchscreen device, for emulating a mouse switch activation.

15. The invention as set forth in claim 13, wherein:
a) said mouse switch activation comprises a closure of the mouse switch, followed by a finite time delay, followed by an opening of the mouse switch.

16. The invention as set forth in claim 1, and further including:
a) a switch in said interface circuit, for simulating an activation of a mouse switch, said interface circuit transmitting said simulated activation to the dedicated mouse port connector receptacle of the host computer.

17. The invention as set forth in claim 1, and further including:
a) a light emitting diode, for indicating when the calibrating means is inoperative.

18. The invention as set forth in claim 1, wherein:
a) said computer comprises existing mouse-compatible hardware and existing mouse-compatible software installed therein, and
b) said interface circuit is fully compatible with and functionally operational with said existing mouse-compatible hardware of the computer and with said existing mouse-compatible software that is installed in the computer.

19. The invention as set forth in claim 18, wherein:
a) said computer, when operating with said interface circuit, is devoid of additional interior hardware beyond said existing mouse-compatible hardware of the computer.

20. Microcomputer for connection between a touchscreen device and a computer having an exteriorly accessible dedicated mouse port receptacle, for positioning the cursor of the computer's display at a predetermined point with respect to the touchscreen device, said microcomputer comprising in combination:
a) means disposed entirely exteriorly of the computer, for correlating an initial calibrating positioning of the cursor with respect to a pointing device applied to a first position on the touchscreen device,
b) means disposed entirely exteriorly of the computer, for discriminating between the initial calibrating positioning of the cursor, and subsequent positioning of the cursor as brought about by a subsequent movement of the touchscreen pointing device to a new, second position,
c) means disposed entirely exteriorly of the computer, for calculating the direction and the distance between the position of the pointing device when applied to said first position and the said new, second position of the pointing device on the touchscreen device,
d) means disposed entirely exteriorly of the computer, for converting said calculated direction and said calculated distance directly into mouse-compatible code signals that simulate movement of the cursor substantially in said same direction and by an amount substantially equal to said distance, and
e) means disposed entirely exteriorly of the computer, for feeding said mouse-compatible code signals into the dedicated mouse port receptacle of the computer so as to move the cursor in the direction corresponding to that traversed by the pointing device, and by a distance corresponding to that traversed by the pointing device over the touchscreen, the cursor subsequently occupying said new position substantially underlying the pointing device on the touchscreen device.

21. The invention as set forth in claim 20, wherein:
a) said touchscreen device produces X-axis and Y-axis output data,
b) said microcomputer comprising a touchscreen coordinate memory,
c) said discriminating means comprises a pointing device-responsive timer, and application of said pointing device to the touchscreen device for a length of time greater than a predetermined calibrating time interval results in said X-axis and Y-axis output data received from the touchscreen device, being stored in the said touchscreen coordinate memory, as a calibrating reference.

22. The invention as set forth in claim 20, wherein:
a) said microcomputer has a memory which is preloaded with firmware setting forth the total number of pixels in the screen of the host computer, and the specific arrangement of said pixels in vertical columns and horizontal rows.

23. In an interface circuit for connection between a touchscreen device and a computer having a screen and a cursor moveable across the screen, said touchscreen device being disposed entirely exteriorly of the computer, said computer further having an exteriorly accessible dedicated mouse port receptacle, the method of implementing an absolute positioning of the cursor on the computer screen by means of a pointing device associated with the touchscreen device, said method comprising the steps of:
a) calibrating an initial position of the cursor on the computer screen, to correlate said initial position to X-axis and Y-axis based data in the touchscreen device,
b) retrieving said X-axis and Y-axis based data from the touchscreen device, and storing the retrieved data in a memory of the interface circuit,
c) applying said pointing device to a random point on the touchscreen device, so as to cause said touchscreen device to produce new X-axis and Y-axis based data corresponding to the location of the said random point, d) producing voltages corresponding to the difference in the data stored in the memory and the new data received from said application of the pointing device to the touchscreen device, as to both the direction and the displacement of the pointing device with respect to said initial position of the cursor, e) converting said difference voltages, into mouse port compatible protocol signals, and f) transmitting said mouse port compatible protocol signals solely to the said exteriorly accessible dedicated mouse port receptacle of the computer, such that the cursor on the computer screen, following initial calibration, moves in succession, to different points that in each instance, substantially underlie the pointing device associated with the said exteriorly disposed touchscreen device.

24. The invention as set forth in claim 23, wherein the step of calibrating the initial position of the cursor comprises applying the pointing device to the touchscreen device for a length of time greater than a predetermined calibration time interval.

25. The invention as set forth in claim 24, wherein:
a) the step of applying the pointing device to the a random point on the touchscreen device is carried out over a time interval which is less than the said predetermined calibration time interval, so as not to upset said calibrating step.

26. The invention as set forth in claim 23, wherein:
a) the step of producing voltages is carried out anew, each time that the pointing device is applied anew to the touchscreen device.

27. The invention as set forth in claim 23, wherein:
a) said touchscreen device is of the pressure-operated type, and wherein said calibrating step comprises applying a pressing force on said touchscreen device for a length of time greater than a predetermined calibrating time interval.

28. The invention as set forth in claim 18, wherein:
a) said computer, when operating with said interface circuit, is devoid of additional software beyond said existing mouse-compatible software installed in the computer.

* * * * *